United States Patent
Hegdal et al.

(10) Patent No.: US 10,171,373 B2
(45) Date of Patent: *Jan. 1, 2019

(54) VIRTUAL MACHINE DEPLOYMENT AND MANAGEMENT ENGINE

(71) Applicant: VMware, Inc., Palo Alto, CA (US)

(72) Inventors: Gururaja Hegdal, Bangalore (IN); Kiran Kasala, Bangalore (IN); Marichetty M. S, Bangalore (IN)

(73) Assignee: VMWARE INC., Palo Alto, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/594,243

(22) Filed: May 12, 2017

(65) Prior Publication Data

US 2017/0249182 A1    Aug. 31, 2017

Related U.S. Application Data

(63) Continuation of application No. 14/010,802, filed on Aug. 27, 2013, now Pat. No. 9,654,411.

(51) Int. Cl.
*H04L 12/911* (2013.01)
*G06F 9/48* (2006.01)
*G06F 9/50* (2006.01)
*G06F 9/455* (2018.01)

(52) U.S. Cl.
CPC .......... *H04L 47/70* (2013.01); *G06F 9/45558* (2013.01); *G06F 9/4856* (2013.01); *G06F 9/5077* (2013.01); *G06F 2009/4557* (2013.01); *G06F 2009/45562* (2013.01); *G06F 2009/45575* (2013.01); *G06F 2009/45595* (2013.01)

(58) Field of Classification Search
CPC ... H04L 47/70; G06F 9/45558; G06F 9/4856; G06F 9/5077; G06F 2009/45562; G06F 2009/4557; G06F 2009/45575; G06F 2009/45595

See application file for complete search history.

(56) References Cited

U.S. PATENT DOCUMENTS

| | | | |
|---|---|---|---|
| 7,689,794 B2 | 3/2010 | Allen et al. | |
| 8,490,092 B2 | 7/2013 | Reuther et al. | |
| 8,745,351 B2 | 6/2014 | Scales et al. | |
| 9,378,136 B1 | 6/2016 | Martin | |
| 2005/0108292 A1 | 5/2005 | Burton et al. | |
| 2008/0098154 A1 | 4/2008 | Traut et al. | |
| 2009/0113109 A1 | 4/2009 | Nelson et al. | |

(Continued)

OTHER PUBLICATIONS

Office Action dated Apr. 15, 2015 in counterpart U.S. Appl. No. 14/069,646.

(Continued)

*Primary Examiner* — Wing F Chan
*Assistant Examiner* — Billy H Ng
(74) *Attorney, Agent, or Firm* — Thomas Horstmeyer, LLP

(57) ABSTRACT

A virtual machine deployment and management engine deploys virtual machines to physical host computers based on a deployment time matrix. The deployment time matrix specifies approximate amounts of time used to clone or deploy a virtual machine from every host computer to every other host computer. The virtual machine deployment and management engine selects a deployment path based on the deployment times and executes the clone or deploy operations.

20 Claims, 13 Drawing Sheets

(56) References Cited

U.S. PATENT DOCUMENTS

| | | |
|---|---|---|
| 2010/0057913 A1 | 3/2010 | DeHaan |
| 2010/0235669 A1 | 9/2010 | Miyamuko |
| 2011/0010515 A1* | 1/2011 | Ranade ............... G06F 11/1451 718/1 |
| 2011/0131330 A1 | 6/2011 | Beaty et al. |
| 2011/0145380 A1 | 6/2011 | Glikson et al. |
| 2011/0161491 A1* | 6/2011 | Sekiguchi ............ G06F 9/4856 709/224 |
| 2011/0191565 A1 | 8/2011 | LeGendre et al. |
| 2012/0110574 A1* | 5/2012 | Kumar ................ G06F 9/45558 718/1 |
| 2012/0117212 A1* | 5/2012 | Fries ........................ G06F 8/61 709/223 |
| 2012/0278799 A1 | 11/2012 | Starks et al. |
| 2012/0303858 A1 | 11/2012 | Ginzton |
| 2012/0331462 A1 | 12/2012 | Falko |
| 2013/0073779 A1 | 3/2013 | Prasad |
| 2013/0086272 A1 | 4/2013 | Chen et al. |
| 2013/0138764 A1 | 5/2013 | Satapathy |
| 2013/0326173 A1* | 12/2013 | Tsirkin ............... G06F 9/45558 711/162 |
| 2013/0346472 A1 | 12/2013 | Wheeldon |
| 2014/0115162 A1* | 4/2014 | Kalyanaraman ............................ H04L 29/08954 709/226 |
| 2014/0196033 A1 | 7/2014 | Bobroff et al. |
| 2014/0208329 A1* | 7/2014 | Abali .................. G06F 9/45533 718/104 |
| 2014/0229936 A1* | 8/2014 | Gaonkar ............. G06F 9/45558 718/1 |
| 2014/0244950 A1 | 8/2014 | Baron et al. |
| 2015/0020069 A1* | 1/2015 | Patani ................ G06F 9/45558 718/1 |
| 2015/0074054 A1 | 3/2015 | Antony |
| 2016/0019159 A1 | 1/2016 | Ueda et al. |
| 2016/0246628 A1 | 8/2016 | Litke et al. |
| 2017/0052717 A1 | 2/2017 | Rawat et al. |

OTHER PUBLICATIONS

European Search Report—Application No. 14175637, dated May 30, 2016, Consists of 9 Pages.

* cited by examiner

| | DEPLOYMENT TIME MATRIX 135 | | | |
|---|---|---|---|---|
| Row | Links | Deployment Time | Preferred Path | Precondition |
| 1 | SOURCE 140 → HOST 150₁ | 10 | Yes | - |
| 2 | SOURCE 140 → HOST 150₂ | 30 | No | - |
| 3 | SOURCE 140 → HOST 150₃ | 40 | No | - |
| 4 | HOST 150₁ → HOST 150₂ | 10 | Yes | Activate when VM deployed to HOST 150₁ |
| 5 | HOST 150₁ → HOST 150₃ | 15 | Yes | Activate when VM deployed to HOST 150₁ |
| 6 | HOST 150₂ → HOST 150₁ | 10 | No | - |
| 7 | HOST 150₂ → HOST 150₃ | 5 | Yes | Activate when VM deployed to HOST 150₂ |
| 8 | HOST 150₃ → HOST 150₁ | 15 | No | - |
| 9 | HOST 150₃ → HOST 150₂ | 5 | No | - |

DEPLOYMENT TIME MATRIX 135

| Row | Links | Deployment Time | Preferred Path | Precondition |
|---|---|---|---|---|
| 1 | SOURCE 140 → HOST $150_1$ | 10 | Yes | - |
| 2 | SOURCE 140 → HOST $150_2$ | 35 | No | - |
| 3 | SOURCE 140 → HOST $150_3$ | 45 | No | - |
| 4 | HOST $150_1$ → HOST $150_2$ | 10 | Yes | Activate when VM deployed to HOST $150_1$ |
| 5 | HOST $150_1$ → HOST $150_3$ | 25 | No | - |
| 6 | HOST $150_2$ → HOST $150_1$ | 10 | No | - |
| 7 | HOST $150_2$ → HOST $150_3$ | 5 | Yes | Activate when VM deployed to HOST $150_2$ |
| 8 | HOST $150_3$ → HOST $150_1$ | 25 | No | - |
| 9 | HOST $150_3$ → HOST $150_2$ | 5 | No | - |

FIG. 7A

DEPLOYMENT TIME MATRIX 135

| Row | Links | Deployment Time | Preferred Path | Precondition |
|---|---|---|---|---|
| 1 | SOURCE 140 → HOST $150_1$ | 10 | Yes | - |
| 2 | SOURCE 140 → HOST $150_2$ | 35 | No | - |
| 3 | SOURCE 140 → HOST $150_3$ | 10 | Yes | - |
| 4 | HOST $150_1$ → HOST $150_2$ | 10 | Yes | Activate when VM deployed to HOST $150_1$ |
| 5 | HOST $150_1$ → HOST $150_3$ | 25 | No | - |
| 6 | HOST $150_2$ → HOST $150_1$ | 10 | No | - |
| 7 | HOST $150_2$ → HOST $150_3$ | 5 | No | - |
| 8 | HOST $150_3$ → HOST $150_1$ | 25 | No | - |
| 9 | HOST $150_3$ → HOST $150_2$ | 5 | Yes | Activate when VM deployed to HOST $150_3$ |

FIG. 7B

VIRTUAL MACHINE DEPLOYMENT AND MANAGEMENT ENGINE

CROSS REFERENCE TO OTHER APPLICATION

This application is a continuation of, and claims priority to, co-pending U.S. patent application Ser. No. 14/010,802, entitled "Virtual Machine Deployment and Management Engine," filed Aug. 27, 2013, the contents of which are incorporated herein by reference.

BACKGROUND

A virtual machine (VM) is a software abstraction, or "virtualization," of an actual physical computer system. Each VM typically mimics the general structure of a physical computer and as such will usually have both virtual system hardware and guest system software. The virtual system hardware typically includes at least one virtual CPU, virtual memory, at least one storage device such as a virtual disk, and one or more virtual devices. All of the virtual hardware components of the VM can be implemented in software to emulate corresponding physical components. The guest system software typically includes a guest operating system and drivers as needed.

Frequently, rather than starting up a new virtual machine from scratch by allocating resources for it, loading and booting an operating system, and then loading and starting specific applications, system operators find it useful to create new working virtual machines that are copies of existing virtual machines, including machines that are currently running and those that are powered off. To start up a virtual machine in this way, a typical process starts with the creation of a new virtual machine on a suitable host that is a copy of an existing source virtual machine. To clone the contents of an existing source virtual machine that is in a running state, a "snapshot" of the source machine file system is taken, typically with the aid of software residing on the source machine. The snapshot provides an image of the complete state of the source machine file system at a moment in time. To clone a virtual machine that is powered off, a snapshot is not required.

In order for a new VM to be a copy of a source machine, it is cloned to storage associated with new virtual machine. After cloning has been completed, the operating system of the new VM may be loaded and booted, and specific applications of the new VM may be loaded and started. There are many ways of performing this cloning operation. In a typical computing environment, the new VM is connected to the source machine over a network, and the data are transferred over that network. The VM storage can be local (such as all or a portion of a disk drive attached directly to the physical machine which hosts the VM), or it can be located remotely, for example, in a Storage Area Network (SAN) accessible from the VM. Regardless of the specific hardware and software details, the cloning operation can take a considerable amount of time. The amount of time will vary according to the implementation details, the resulting average data transfer rates, and the size of the source machine file system that must be transferred. For typical machines and networks in common use in 2008, the size of the source file system can be 50 GB or more, and typical average data transfer rates can be about 20 MB/s. Thus, a complete cloning operation can take at least 2500 seconds or about 40 minutes. Significantly longer times are not uncommon, especially for servers running data-intensive applications that can have much larger file systems.

SUMMARY OF THE DISCLOSURE

Embodiments of the present disclosure provide a method of managing deployment of virtual machines in a plurality of hosts connected to a computer network. The plurality of hosts includes a source host computer and one or more target host computers. The method includes receiving a request to deploy a virtual machine residing on the source host computer to a plurality of target host computers having a first target host. The method further includes determining deployment times between the plurality of hosts and determining a path from the source host computer to the first target host based on the determined deployment times. The method includes deploying a copy of the virtual machine from the source host computer to the first target host based on the determined path.

In another embodiment of the present disclosure, a non-transitory computer readable storage medium stores computer readable program code for managing deployment of virtual machines in a plurality of hosts connected to a computer network. The plurality of hosts includes a source host computer and one or more target host computers. The computer readable program code includes computer readable program code to receive a request to deploy a virtual machine residing on the source host computer to a plurality of target host computers having a first target host, and computer readable program code to determine deployment times between the plurality of hosts. The computer readable program code further includes computer readable program code to determine a path from the source host computer to the first target host based on the determined deployment times, and computer readable program code to deploy a copy of the virtual machine from the source host computer to the first target host based on the determined path.

Other embodiments of the present disclosure provide a virtualized computing system. The virtualized computing system includes a source host computer, a plurality of target host computers having a first target host, a network that connects the source and target host computers. The virtualized computing system further includes a management server configured to manage deployment of virtual machines to the plurality of target host computers. The management server is configured to receive a request to deploy a virtual machine residing on the source host computer to the plurality of target host computers, determine deployment times between the plurality of hosts, and determine a path from the source host computer to the first target host based on the determined deployment times. The management server is further configured to deploy a copy of the virtual machine from the source host computer to the first target host based on the determined path.

BRIEF DESCRIPTION OF THE DRAWINGS

FIGS. 7A and 7B are tables that depict deployment time matrices before and after a change in deployment time of one of the links in a computer network.

DETAILED DESCRIPTION

Figure 1:
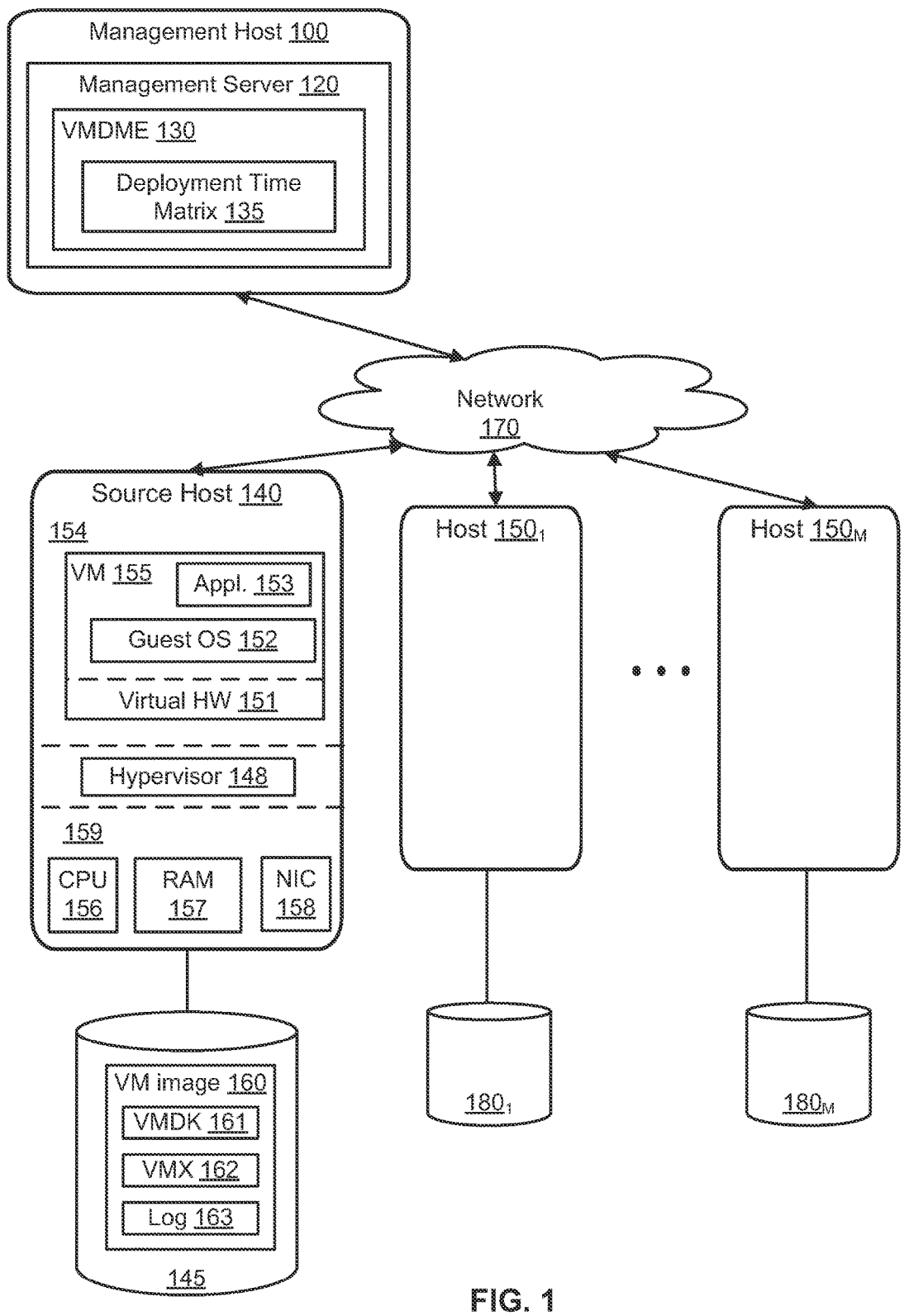
FIG. 1 is a block diagram that shows a computer network comprised of a management host, a source host, and target hosts in which embodiments may be implemented.

FIG. 1 is a block diagram that depicts an example of a network of host computers in which embodiments may be implemented. A plurality of hosts, including a source host 140 and one or more target hosts 150 (e.g., $150_1$ to $150_M$), are connected to network 170. The hosts may be desktop computers, laptops, or server grade computers and are each capable of implementing a virtualized system architecture. Referring to FIG. 1, source host 140 is representative of the hosts connected to network 170, and includes a physical hardware platform 159, a hypervisor 148, and a virtual machine (VM) execution space 154 in which one or more VMs may run. Physical hardware platform 159 is comprised of one or more CPUs 156, a random access memory (RAM) 157, and a network interface (NIC) 158. Hardware platform 159 may implement any of a number of system architectures, such as the x86 architecture.

Source host 140 is connected to a physical data store 145. In some embodiments, data store 145 may be a single disk storage medium. Data store 145 may also be a SCSI, Fibre Channel, or iSCSI storage array. Storage arrays may be of any type such as a network-attached storage (NAS) filer or a block-based device over a storage area network (SAN). Further, hosts 150 may be connected to one or more data stores 180 (e.g., $180_1$ to $180_M$), which may also be of the aforementioned types of storage. In addition, data stores 180 may be dedicated to a single host 150, or they may be shared among two or more hosts 150 or with source host 140.

Hypervisor 148 is software that manages the hardware and CPU resources encapsulated in hardware platform 159 and enables the execution of one or more VMs 155 in VM execution space 154. For each VM 155, hypervisor 148 manages a virtual hardware platform 151 that includes emulated hardware such as virtual CPUs and virtual storage. One example of hypervisor 148 is included as a component of VMware's vSphere® product, which is commercially available from VMware, Inc. of Palo Alto, Calif. It should be recognized that other virtualized computer systems are contemplated, such as hosted virtual machine systems, where the hypervisor is implemented in conjunction with a host operating system.

As shown in FIG. 1, VM 155 runs in VM execution space 154. In general, a VM is a software implementation of a physical computer. A VM implements a virtual hardware platform that supports the installation of a guest operating system which is capable of executing applications. Examples of a guest operating system include any of the well-known commodity operating systems, such as Microsoft Windows®, Linux® operating systems, and the like. As shown in FIG. 1, VM 155 includes virtual hardware platform 151, guest operating system 152, and one or more guest applications 153. It should be recognized that while VM 155 is described as single virtualized unit corresponding to a physical computer, other embodiments of VMs may be utilized according to techniques described herein. For example, in some embodiments, VM 155 may be a collection of one or more VMs, sometimes referred to as a virtual appliance, that are packaged, maintained, updated, and managed as a unit to run one or more applications that provide a specific set of services. One example of a virtual appliance may be a vApp product, which is made commercially available from VMware, Inc. of Palo Alto, Calif. In other embodiments, VM 155 may be a virtual machine template, sometimes referred to simply as a template, which is a reusable image created from a virtual machine that may be used by an administrator to deploy or clone many copies of a pre-configured virtual machine to remote hosts.

Further, the state of VM 155 (e.g., the contents of virtual memory, the contents of virtual disk storage, and the execution state of virtual CPUs) may be represented in data stored in a plurality of data files that comprise a VM image 160 within data store 145. In some embodiments, the set of data files comprising a VM image 160 may include one or more files storing virtual disk contents (e.g., VMDK, or Virtual Machine Disk, file 161); one or more files storing virtual hardware configuration data for VM 155 (e.g., a VMX file 162); and one or more log files 163, which store an activity log for VM 155 that can be used for troubleshooting. Other data files may be included in VM image 160 which fully describe the current state of VM 155. It should be recognized that VM image 160 corresponding to VM 155 may be interchangeably referred to as simply "VM 160."

FIG. 1 also depicts a management host 100, which hosts a management server 120. As is the case for hosts $150_M$, management host 100 may be a desktop, laptop, or server grade computer capable of implementing a virtualized system architecture. Management server 120 is a computer program that serves as a single point of control for hosts connected to network 170. Management server 120 may reside and execute in a central server, as is shown in FIG. 1, or, alternatively, in a VM in source host 140 or one of hosts 150$_M$. Management server 120 maintains communication with source host 140 and each of hosts 150$_M$, and carries out administrative tasks such as load balancing between hosts and workload balancing between data stores.

Management server 120 also manages the deployment of VMs to hosts 150$_M$. VM deployment entails: (1) receiving a request to provide a number of VMs to run on one or more hosts 150$_M$, where multiple VMs may be provided to a single host 150; (2) accessing the data files of VM image 160 stored in data store 145 for a particular virtual machine, called a "source" VM, which resides on a source host 140; (3) transmitting copies of VM image 160 to the hosts 150$_M$ that are to be provided VMs; and (4) storing the transmitted copies of VM image 160 to the respective data stores 180 associated with each host 150. After these steps are completed for a particular host 150, a VM is deployed to that host 150. Once a VM is deployed to a host 150, the VM may be started and begin executing on that host.

In a large computing environment (such as a datacenter for a large organization), administrators are often required to deploy a large numbers of VMs for various purposes. For example, VMs may be deployed to employees to perform various job duties, or VMs may be deployed to run as database or print servers. This entails the transmission of a large number of copies of a VM 160, which can burden a network 170. In prior VM deployment implementations, a single source VM 160 has been used as the source for an entire deployment of VMs on a network. There are a number of drawbacks to this approach. For example, if a single source VM deployment is used, there is a single failure point for the entire deployment. In other words, there is no redundancy built into the deployment process. Next, if a host 150 requires multiple VMs deployed therein, a single source deployment will transmit multiple copies of the source VM 160 to the host 150, resulting in increased network traffic. Further, single source VM deployment does not provide for the adjustment of the path between source and destination hosts, which leads to inefficiencies when source and destination hosts are geographically distant from each other.

To address the drawbacks of single source VM deployment, management server 120 includes a Virtual Machine Deployment and Management Engine (VMDME) 130. VMDME 130 initiates and manages the deployment of a source VM to multiple target hosts 150 connected to network 170. As shown in FIG. 1, a source host 140 hosts a source VM 155, where the state information of VM 155 is stored in VM 160. As previously mentioned, VM 160 comprises the data that is to be deployed to other hosts 150 connected to network 170. VMDME 130 is configured to perform clone or deploy operations for a VM (e.g., VM 160) onto any of the hosts 150 connected to network 170 using a deployment time matrix 135.

In one embodiment, VMDME 130 is configured to compute deployment times needed to clone or deploy a VM from every host to every other host. For example, in the embodiment shown, deployment time matrix 135 specifies a deployment time from a source host 140 to each target host 150, as well as deployment times between each pair of hosts 150 themselves. The deployment time represents an approximate amount of time taken by management server 120 to clone or deploy a virtual machine from a source to a destination.

In some embodiments, VMDME 130 initializes deployment time matrix 135 by transmitting a number of bytes over network 170 and measuring the point to point data transmission time over links that connect the hosts 150. The data transmission times are used as bases to calculate the deployment times stored in deployment time matrix 135. Further, embodiments of VMDME 130 monitor network 170 for changes that may affect the data transmission time between hosts 150, such as changes in network capacity or utilization. Embodiments of VMDME 130 may also monitor the CPU and memory utilization of the hosts 150, or the disk I/O activity for data stores 180 connected to the hosts 150, which may also have an effect on data deployment time. Upon detecting any changes in data transmission times as a result of network changes, or deployment times as a result of host and data store activity, VMDME 130 updates the deployment time matrix 135.

Figure 2:
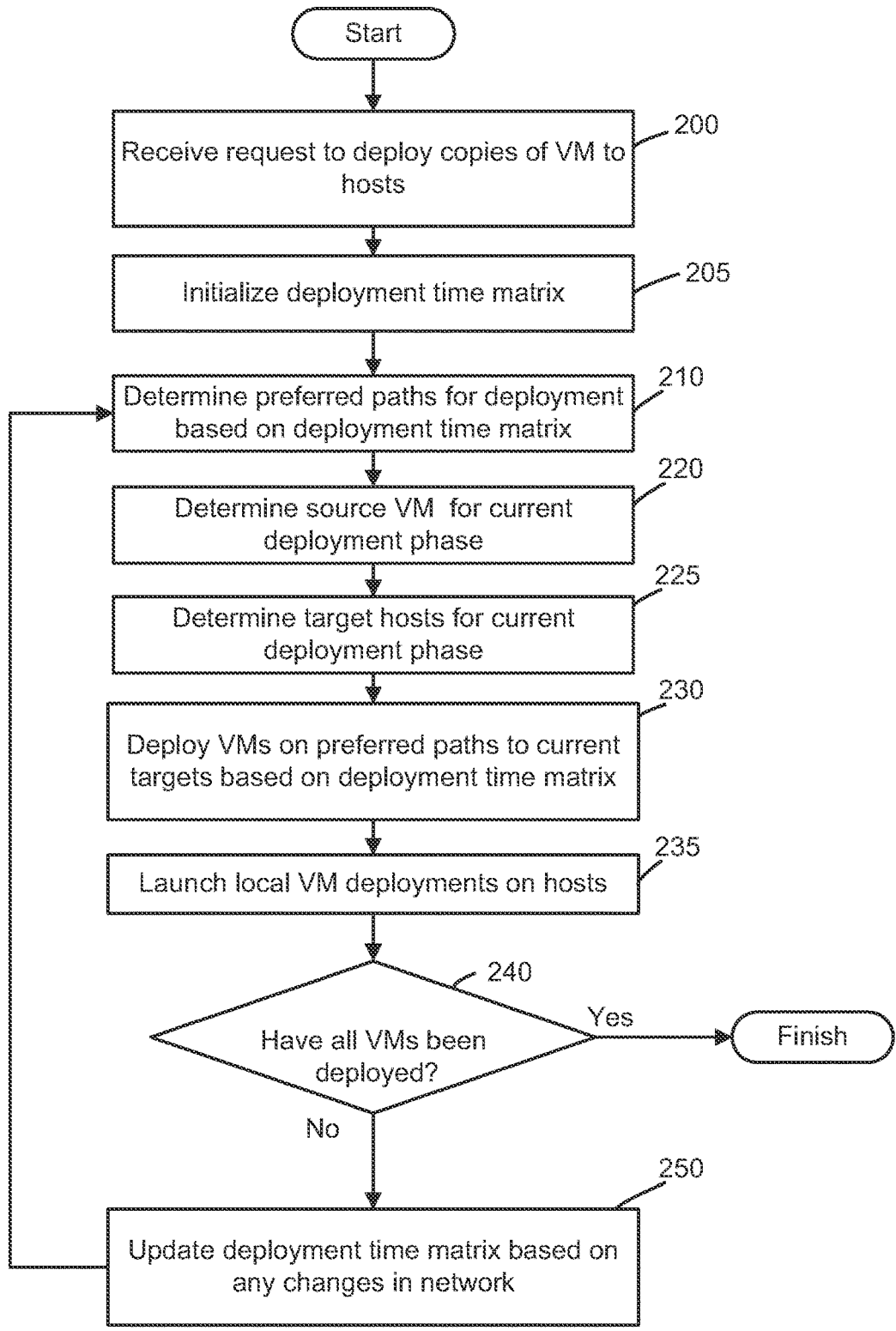
FIG. 2 is a flow diagram that illustrates the steps carried out by a Virtual Machine Deployment and Management Engine (VMDME) to deploy virtual machines to hosts connected to a computer network.

FIG. 2 is a flow diagram that depicts the steps of a process carried out by an embodiment of VMDME 130 to deploy a source VM 160 to a plurality of target hosts 150, as depicted in FIG. 1. At step 200, VMDME 130 receives a deployment request from a system administrator or end user to deploy a number of VMs to a set of hosts 150. In embodiments, VMDME 130 decides on the number of VMs to deploy on each target host based on resource availability (e.g., free storage) on each target host. In some embodiments, the administrator makes the request through a user interface or other type of input mechanism. In some embodiments, a deployment request specifies a first source host 140, a source VM 160 stored in the data store 145 connected to source host 140, a set of target hosts 150 that are to be deployed to, a number of VMs to be deployed to each host 150, and a set of data stores 180 in which the copies of the deployed VMs are to be stored.

At step 205, VMDME 130 determines and initializes a deployment time matrix 135. As previously mentioned, the deployment time matrix 135 provides the point to point data transmission times over links between each pair of hosts 150$_M$ connected to network 170. The data transmission times are determined, in embodiments, by VMDME 130 transmitting a number of bytes of data from host 150$_a$ to host 150$_b$, where a≠b. The determined transmission time is the time it takes for the transmitted bytes to travel over a link between host 150$_a$ and host 150$_b$, where the transmitted bytes do not pass through any other host 150 in computer network 170. In like fashion, the data transmission time between source host 140 and each host 150 is determined. As earlier mentioned, data transmission time between hosts may depend on a number of factors, such as, for example, network capacity, disk I/O, network traffic, and the CPU load on the individual hosts.

Next, at step 210, VMDME 130 determines, for each host 150$_a$, a set of preferred paths, where each preferred path proceeds over network 170 from a host 150$_a$ to every other host 150$_b$, where a≠b. In one embodiment, a preferred path is deployment path VMDME 130 will select from in order to deploy source VM 160. For example, if there are three hosts connected to network 170 (e.g., hosts 150$_1$, 150$_2$, and 150$_3$), VMDME 130 will determine nine separate preferred paths (i.e., 3 hosts 150$_a$×(2 paths to each of hosts 150$_b$+1 path from source host 140 to host 150$_a$)=9 paths). The preferred paths are determined based on the deployment time matrix 135. In one embodiment, a preferred path between a pair of hosts (or source host 140 and a host 150) has the shortest deployment time between the hosts, given the prevailing state of network 170. The preferred path between a pair of hosts 150 (e.g., host 150$_1$ and host 150$_2$) may be over a direct link, or the preferred path may pass through another host. (e.g., 150$_3$). For example, if the deployment time from a host 150$_1$ to a host 150$_2$ is 2 minutes, the deployment time from a host 150$_2$ to a host 150$_3$ is 5 minutes, and the data transmission time from host $150_1$ and a host $150_3$ is 10 minutes, then the preferred path from host $150_1$ to host $150_3$ passes through host $150_2$ (because 2 minutes+5 minutes<10 minutes).

Figures 3A, 3B:
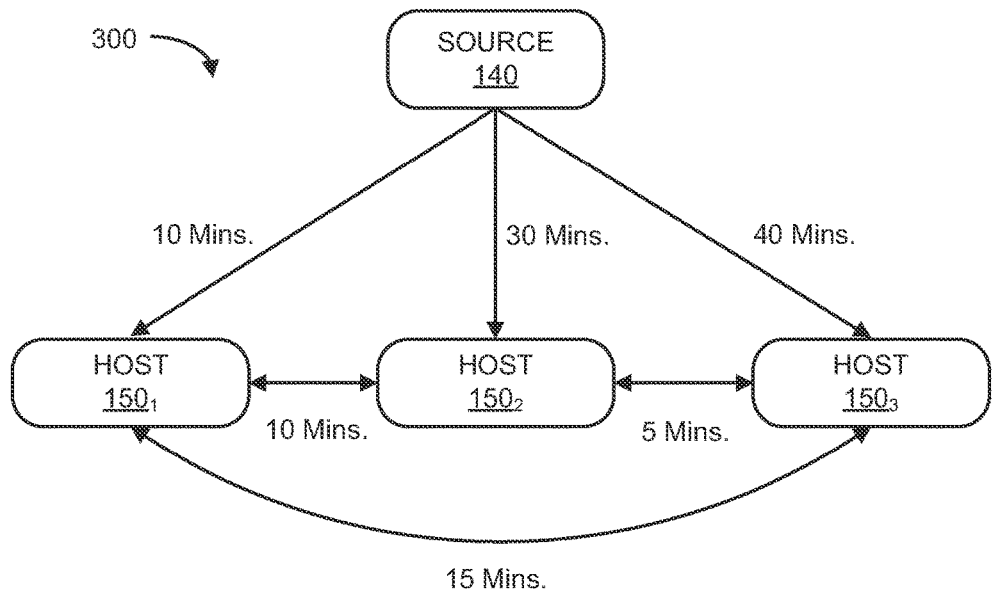
FIG. 3A is a block diagram depicting a computer network that connects a source with target hosts over which virtual machine deployments take place.
FIG. 3B is a table depicting a deployment time matrix that is used by a VMDME to determine paths over which to deploy virtual machines.

FIGS. 3A and 3B are, respectively, a block diagram and table that illustrate the determination of the deployment time matrix 135 and the set of preferred paths, as set forth in steps 205 and 210 of FIG. 2. FIG. 3A depicts a source host and three target hosts connected in a network 300, according to embodiments. As shown, there is a direct link (i.e., a link without any intervening hosts) between source host 140 and each of hosts $150_1$, $150_2$, and $150_3$. Further, stated in general terms, each host $150_a$ is linked directly to each of the other hosts $150_b$, where a b. As shown, a deployment time is associated with each link. For example, the deployment time from source host 140 to host $150_1$ is 10 minutes; the deployment time from host $150_1$ to host $150_3$ is 15 minutes, etc.

The deployment times illustrated in FIG. 3A are used in initializing an embodiment of deployment time matrix 135 depicted in FIG. 3B. In one embodiment, deployment time matrix 135 may be a table with multiple columns rows and columns. Referring to the FIG. 3B, the first column is labeled "Links." This column sets forth all of the direct links between each pair of hosts 150. The second column, labeled "Deployment Time" in FIG. 3B, specifies the deployment times for each of the individual link depicted in FIG. 3A. The third column, which is labeled "Preferred Path", specifies whether a particular link between two hosts 150 lies on any preferred path between a source host and any target hosts for a current phase of the overall deployment. A "Yes" entry specifies that a particular lies on a preferred path between a source host and one or more targets, while a "No" entry specifies that the link does not lie on any such preferred path. The preferred paths between a pair of hosts 150 (or between a source host 140 and a host 150), as previously mentioned, is the network path having the shortest deployment time between those hosts. For example, referring to FIG. 3B, the link between source host 140 and host $150_1$ is identified as being on a preferred path because it is a part of the network path having the shortest deployment time from source host 140 to host $150_1$. Indeed, the link between source host 140 and host $150_1$ comprises the entire preferred path between source host 140 and host $150_1$.

In similar fashion, the link between host $150_1$ and host $150_2$ is identified in FIG. 3B as being on a preferred path because it is a part of the network path having the shortest deployment time between source host 140 and host $150_2$. Indeed, as is shown by rows 1 and 4 of deployment time matrix 135, the path that includes the link between source host 140 and host $150_1$, and the link between host $150_1$ and host $150_2$ has a total deployment time of 20 minutes (i.e., 10 minutes+10 minutes). By contrast, the link from source host 140 to host $150_1$ has a deployment time of 30 minutes, as shown by row 2 of deployment time matrix 135.

As previously mentioned, a link that does not lie on any preferred path between a source host and target host is identified by a "No" entry in the Preferred Path column. For example, referring to FIG. 3B, the link from source host 140 to host $150_2$ in row 2 is not on a preferred path because it does not lie on any of the paths from source host 140 to any of hosts $150_1$, $150_2$, and $150_3$, where each of those paths has the shortest deployment time.

The fourth column in the deployment time matrix 135 depicted in FIG. 3B is labeled "Precondition." This column specifies a precondition that must be satisfied in order for a particular link to become deployable as a part of a preferred path. Generally, the precondition that must be satisfied is the deployment of a VM to a host. For example, the link from source host 140 to host $150_1$ has no precondition specified. In other words, this link is initially deployable on a preferred path (i.e., the path from source host 140 to host $150_1$) because the source VM is initially stored on source host 140, before any VM deployments occur. By contrast, the link from host $150_1$ to host $150_2$ becomes deployable in a preferred path (specifically, the preferred path from source host 140 to host $150_2$) after a VM is deployed to host $150_1$. This is the case because, as previously shown, the preferred path from source host 140 to host $150_2$ proceeds from source host 140 to host $150_1$, and then proceeds from host $150_1$ to host $150_2$. Thus, in order to deploy a VM from source host 140 to host $150_2$ over the preferred path between them, VMDME 130 must first deploy from source host 140 to host $150_1$ and then deploy from host $150_1$ to host $150_2$.

Referring back to FIG. 2, after the preferred paths are determined in step 210, VMDME 130, at step 220, determines the source host and source VM that are to serve as source in a current phase of the overall deployment of VM 160. For example, source host 140, which was specified in the request received at step 200, initially serves as the source host for the overall deployment of VM 160. However, as VMs are deployed to target hosts 150, one or more of the target hosts 150 deployed to may serve as a source host in a subsequent phase of the overall deployment of VM 160. For example, if VMDME 130 determines during a phase of the overall deployment, based on deployment time matrix 135, that the path from a deployed host $150_1$ and another host $150_2$ that has not yet been deployed to has a shorter deployment time than a path from the initial source host 140 to the same target host $150_2$, then VMDME 130 makes host $150_1$ a source for the current deployment phase and deploys to target host $150_2$ from host $150_1$.

Similarly, at step 225, VMDME 130 determines a set of current target hosts to be deployed to in a current phase of the overall deployment of VM 160. The set of current target hosts is a subset of the set of hosts 150 provided in the request at step 200. For example, in a current phase of the overall deployment, VMDME 130 may determine that the preferred path from a current source $150_1$ to a host $150_3$ that has not yet been deployed to passes through another host, $150_2$. Accordingly, VMDME 130 makes host $150_2$ a current target host and deploys a copy of VM 160 from host $150_1$ to host $150_2$ in the current phase of the overall deployment. Assuming the deployment to host $150_2$ completes successfully, and that the data transmission time between hosts $150_2$ and $150_3$ remains unchanged, VMDME 130 then makes host $150_3$ a current target host in a subsequent phase of the deployment and deploys a copy of VM 160 from host $150_2$ to host $150_3$.

At step 230, VMDME 130 launches the deployment of a copy of VM 160 from the determined current source host to the determined current target hosts along the preferred paths determined based on the deployment time matrix 135. In some embodiments, deployment is performed by launching a number of parallel threads that each transmits a copy of VM 160 to a host 150 and store the copy of VM 160 on a data store 180 connected to the host 150.

At step 235, embodiments of VMDME 130 launch, if necessary, "local" VM deployments on hosts 150 that have already been deployed a first VM. A local VM deployment on a host 150 is the copying of a VM 160 that has already been deployed to the host 150 from a data store 180 that is connected to host 150 to one or more identical VMs that are also stored in a data store 180 connected to the host 150. Local VM deployments are launched for a host 150 in the event that more than one VM is to be deployed to the host 150. Deploying VMs locally avoids the transmission of duplicate copies of VM 160 from a source host to the host 150. For example, if the request received at step 200 specifies that a host 150 is to have two copies of VM 160 deployed to it, VMDME 130 deploys a first copy of VM 160 to host 150 over a preferred path. After the first copy of VM 160 is successfully deployed to host 150, VMDME 130 then copies the first deployed VM to a data store 180 that is connected to host 150. Thus, by doing so, VMDME 130 avoids transmitting the copy of VM 160 a second time over network 170.

Figure 4A:
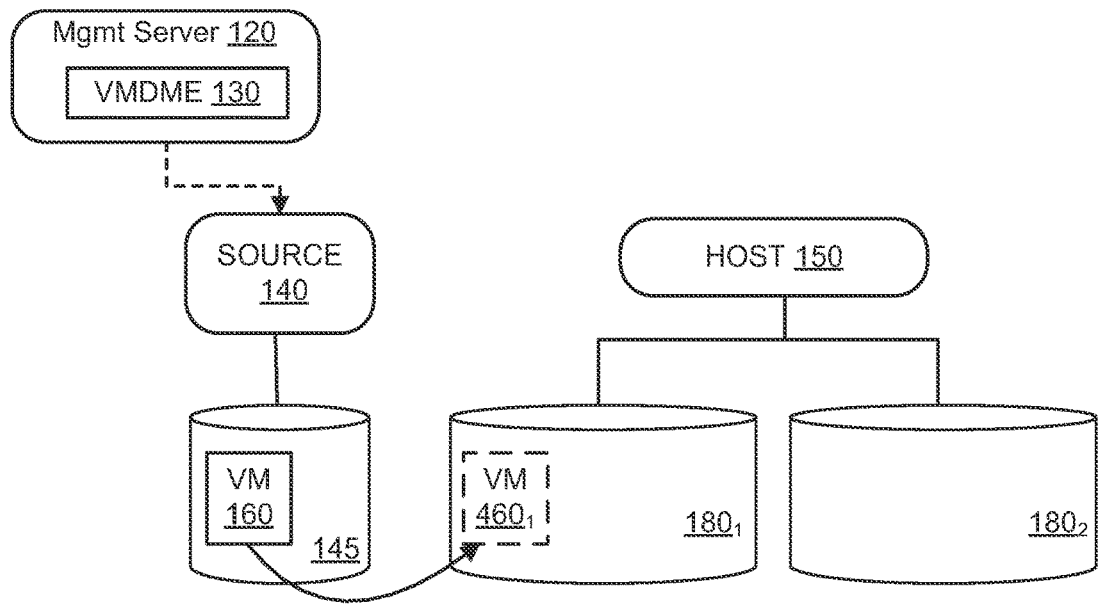
FIGS. 4A, 4B, and 4C are block diagrams that depict the steps carried out by a VMDME to deploy copies of a virtual machine to a target host that is connected to two data stores.
Figure 4B:
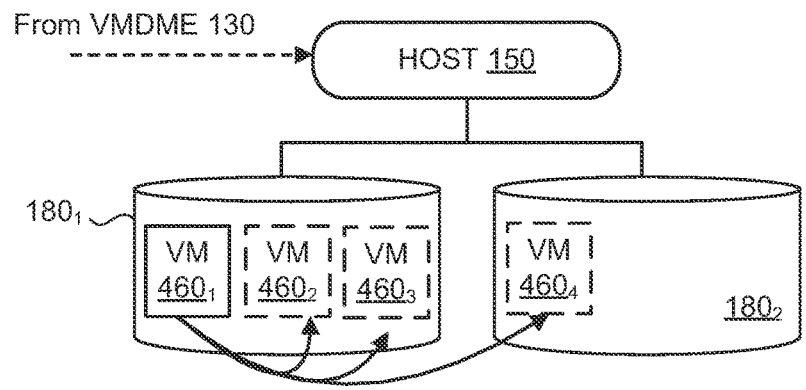
Figure 4C:
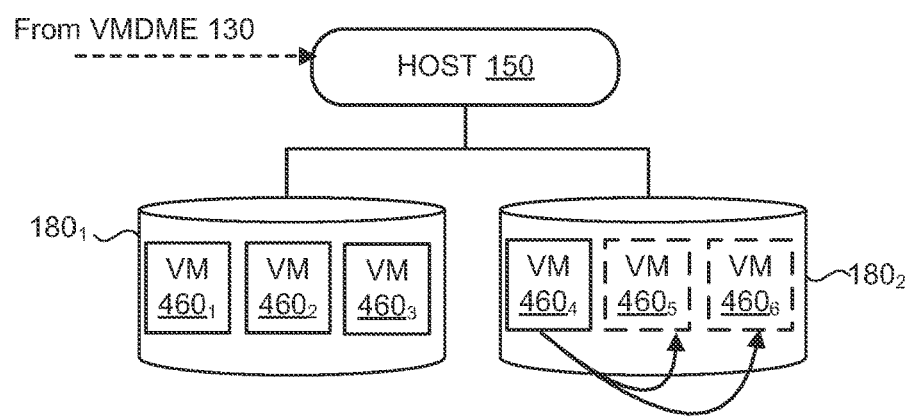

Further, when a host 150 is connected to more than one data store 180, and more than one VM is to be deployed to each of the connected data stores, VMDME 130 deploys a first copy of VM 160 to a first connected data store 180 over a preferred path determined from deployment time matrix 135. After deploying the first copy of VM 160, VMDME 130 then copies the deployed first VM to a second data store 180 connected to host 150. Additional VMs that are required on each data store 180 are copied from the VM already stored on that data store 180. This further minimizes deployment time by avoiding any delays that would arise from copying multiple VMs between data stores. For example, FIGS. 4A, 4B, and 4C are block diagrams that illustrate phases of an example deployment of a source VM to a single target host by an embodiment of VMDME 130, where the target host is connected to a plurality of data stores. In FIG. 4A, source host 140 is connected to data store 145 with VM 160 stored therein. Further, target host 150 is connected to data stores $180_1$ and $180_2$. VMDME 130, which runs under the control of management server 120, receives a deployment request to deploy six copies of VM 160 from source host 140 to host 150, where three copies are to be deployed to data store $180_1$ and three copies are to be deployed to data store $180_2$. As shown, VMDME 130 deploys a first copy of VM 160 (VM $460_1$) to data store $180_1$ connected to target host 150. In FIG. 4A, and all subsequent figures, a VM depicted with dashed lines is undergoing deployment, but is not fully deployed.

In FIG. 4B, the deployment of VM $460_1$ to data store $180_1$ has completed. At this point, after deploying a first VM to host 150, VMDME 130 determines that the remaining five VMs are to be deployed "locally." In other words, instead of transmitting additional copies of VM 160 over a network to host 150, VMDME 130 deploys the remaining VMs using the already deployed VM $460_1$ as a source. Accordingly, VMDME 130 initiates the deployment of VMs $460_2$ and $460_3$ to data store $180_1$ and VM $460_4$ to data store $180_2$ because three copies of VM 160 are to be deployed to each data store 180.

As shown in FIG. 4C, VMs $460_2$, $460_3$, and $460_4$ have been fully deployed. In a last phase of the overall deployment of VM 160, VMDME 130 copies the remaining two VMs (i.e., VM $460_5$ and VM $460_6$) to data store $180_2$ from the deployed copy VM $460_4$, rather than deploying these VMs from source host 140 (where such deployment would be affected by network delays from source host 140 to host $150_2$), or copying these VMs from data store $180_1$ (where such copying would be affected by any latency in the data path between data stores $180_1$ and $180_2$). After VMs $460_5$ and $460_6$ are fully deployed, the overall deployment is complete.

Referring back to FIG. 2, after the deployments to the determined set of current target hosts are completed, VMDME 130, at step 240, determines whether or not all target hosts 150 specified in the request received at step 200 have been deployed to. If the required number of VMs have been deployed to each of the target hosts 150, as specified in the deployment request at step 200, then the overall deployment of VM 160 finishes.

If, however, there remain hosts 150 to which VMs are yet to be deployed to, VMDME 130, at step 250, updates the deployment time matrix 135 in response to detecting a change in any of the resources of network 170 or hosts 150. Changes in resources detected by VMDME 130 include: a change in the capacity of any links between hosts 150; a change in the capacity of any links between source host 140 and any host 150; a change in the topology of network 170; the failure of a link between hosts 150; and a change in the resources of one or more hosts 150 (which may include a change in the utilization of the CPU or memory, or a change in disk I/O activity). Changes VMDME 130 makes to deployment time matrix 135 include: updating the deployment time between hosts 150; updating the deployment time between source host 140 and hosts 150; and whether or not a link between hosts 150 is currently on a preferred path. Deployment times and other metrics determined during prior deployment phases may be used to update the deployment times and preferred path information in a current deployment phase. Further, if no change in any network 170 resource is detected, the deployment time matrix 135 is left unchanged.

The deployment process then returns to step 210 to determine the preferred paths for a next phase of the overall deployment of VM 160. The process depicted in FIG. 2 iterates until all hosts 150 received in the deployment request at step 200 have been fully deployed to.

Figure 5A:
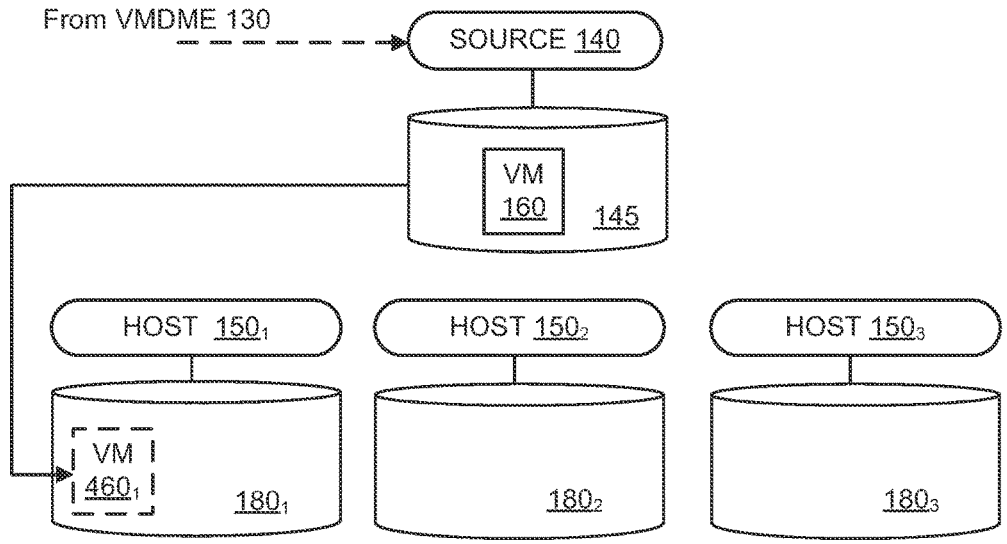
FIGS. 5A, 5B, and 5C are block diagrams that depict the steps carried out by a VMDME to deploy virtual machines from a source to hosts connected in a computer network according to paths determined from a deployment time matrix.
Figure 5B:
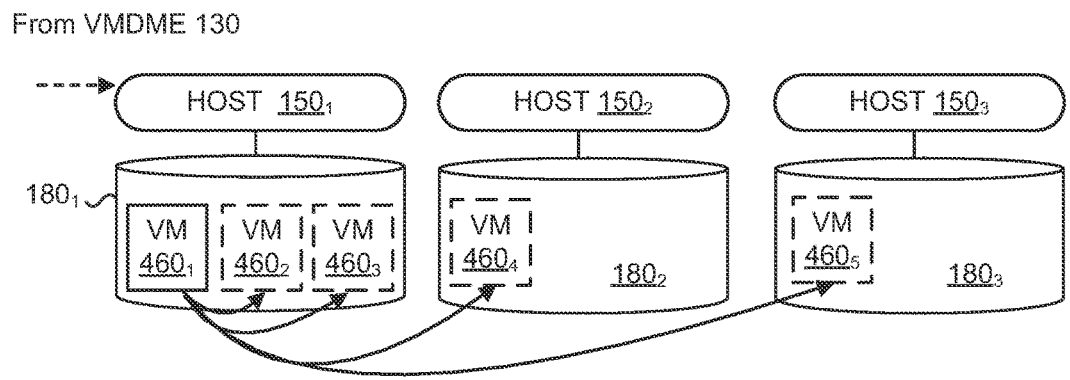
Figure 5C:
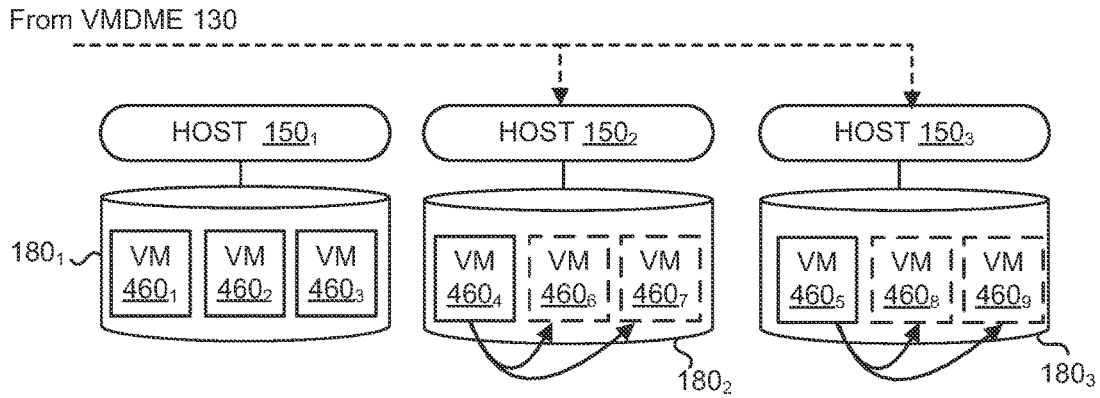

FIGS. 5A, 5B, and 5C are block diagrams that depict the steps carried out by an embodiment of VMDME 130 to deploy multiple copies of a VM to a plurality of hosts 150, where each host 150 is connected to a separate data store 180, and where more than one VM is to be deployed to each host 150. In the embodiment depicted, VMDME 130 deploys three copies of a VM 160 from source host 140 to each of the three hosts $150_1$, $150_2$, and $150_3$. The VM deployments illustrated in FIGS. 5A, 5B, and 5C proceed according to preferred paths determined based on the deployment time matrix 135 depicted in FIG. 3B.

Prior to deploying any VMs, VMDME 130 determines, using deployment time matrix 135, that the preferred path from source host 140 to host $150_1$ proceeds over the direct link from source host 140 to host $150_1$, which, as shown in FIG. 3B, has a deployment time of 10 minutes. Further, VMDME 130 determines that the preferred path from source host 140 to host $150_2$ proceeds from source host 140 to host $150_1$, and then from host $150_1$ to host $150_2$, for a total deployment time of 15 minutes (i.e., 10 minutes+5 minutes). Finally, VMDME 130 determines that there are two preferred paths from source host 140 to host $150_3$, each of which has the same deployment time: (1) from source host 140 to host $150_1$ (which has a deployment time of 10 minutes), and then from host $150_1$ directly to host $150_3$ (15 minutes); or (2) from source host 140 to host $150_1$ (10 minutes), then from host $150_1$ to host $150_2$ (10 minutes), and then from host $150_2$ to host $150_3$ (5 minutes). Therefore, each preferred path from source host 140 to host $150_3$ has the same deployment time of 25 minutes (i.e., 10 minutes+15 minutes=10 minutes+10 minutes+5 minutes).

Referring to FIG. 5A, VMDME 130 deploys a copy of VM 160 to VM $460_1$, which is stored in data store $180_1$ of host $150_1$. In FIG. 5B, VM $460_1$ has been deployed successfully to host $150_1$. VMDME 130 then begins deploying VM $460_1$ on host $150_1$ to VM $460_4$ on host $150_2$, according to the second link in the preferred path from source host 140 to host 150$_2$. Also, as was previously mentioned, the link from host 150$_1$ to host 150$_2$ is also a link in the second preferred path from source host 140 to host 150$_3$. Therefore, the deployment of VM 460$_1$ to VM 460$_4$ furthers the deployment of VM 160 from source host 140 to host 150$_3$. In addition, VMDME 130 commences deploying VM 460$_1$ directly to VM 460$_5$ on host 150$_3$, according to the second link in the first preferred path from source host 140 to host 150$_3$. Finally, FIG. 5B shows that VMDME deploys VM 460$_2$ and VM 460$_3$ "locally" to host 150$_1$ (i.e., by copying deployed VM 460$_1$ to VMs 460$_2$ and 460$_3$) because three copies of VM 160 are to be deployed to each target host.

As shown in FIG. 5C, the local deployments to VMs 460$_2$ and 460$_3$ on host 150$_1$ have completed. Further, the deployments to VM 460$_4$ on host 150$_2$ and to VM 460$_5$ on host 150$_3$ have also completed. Therefore, VMDME 130 begins local deployments from VM 460$_4$ to VM 460$_6$ and VM 460$_7$ on host 150$_2$ and from VM 460$_5$ to VM 460$_8$ and VM 460$_9$ on host 150$_3$. Note that, in FIG. 5C, no deployment of a VM was required on the link from host 150$_2$ to host 150$_3$ (which, as previously mentioned, is a link in the second preferred path from source host 140 to host 150$_3$) because the deployment from host 150$_1$ to host 150$_3$ that was depicted in FIG. 5B had already started (or completed) before VMDME 130 began the deployments depicted in FIG. 5C.

According to one embodiment of the present disclosure, VMDME 130 may detect one or more change events in the plurality of hosts 150 connected by computer network 170 that may cause VMDME 130 to recalculate the deployment times. Examples of change events may include changes in computer network 170 (e.g., latency, connectivity), a failure of one or more hosts located on a selected path between hosts (e.g., from source host computer to a first target host), and a failure of a link between two or more hosts on the computer network located on a selected path between hosts (e.g., from the source host computer to the first target host). As described in greater detail below, VMDME 130 may update and modify the deployment times between the plurality of hosts, and select a new deployment path based on the modified deployment times.

Figure 6:
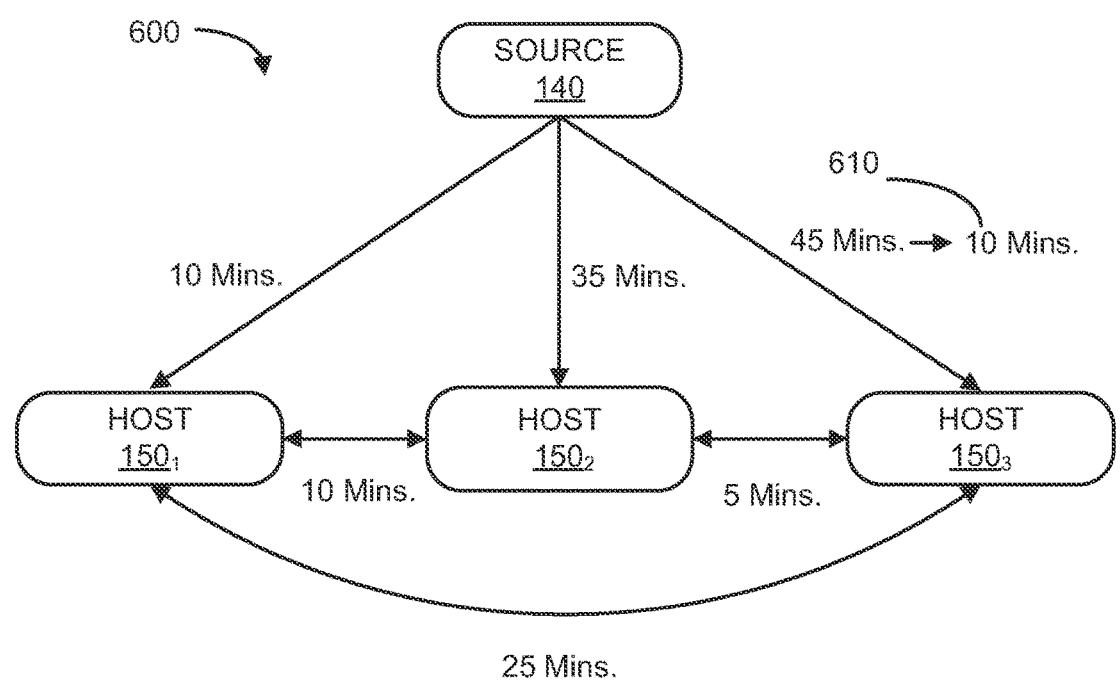
FIG. 6 is a block diagram illustrating a computer network that connects a source with target hosts over which virtual machine deployments take place, where a link in the network experiences a change in its deployment time.

FIG. 6 is a block diagram of a network 600 that, according to embodiments, connects a source to three hosts, and where the deployment time associated with a link between two hosts changes. As shown, source host 140 is linked to each of hosts 150$_1$, 150$_2$, and 150$_3$. Further, each host 150$_a$ is linked to each of the other hosts 150$_b$, where a b. A deployment time is associated with each link. Event 610 depicts the change in the deployment time for the link from source host 140 to host 150$_3$ from 45 minutes to 10 minutes.

The change in the deployment time depicted in FIG. 6 is detected by an embodiment of VMDME 130, which then reflects the change in deployment time matrix 135. The changes VMDME 130 makes to deployment time matrix 135 in response to the change depicted in FIG. 6 are shown in FIGS. 7A and 7B.

FIG. 7A depicts the deployment time matrix 135 that reflects the state of the computer network depicted in FIG. 6 prior to the change in the deployment time from source host 140 to host 150$_3$. As shown in FIG. 7A, the following entries are highlighted: row 3, which refers to the link from source host 140 to host 150$_3$, which is not on any preferred paths; row 7, which refers to the link from host 150$_2$ to host 150$_3$, which is on the preferred path between source host 140 and host 150$_3$; and row 9, which refers to the link from host 150$_3$ to host 150$_2$, which is not on any preferred path.

In response to detecting that the deployment time for the link from source host 140 to host 150$_3$ has changed from 45 minutes to 10 minutes, VMDME 130 updates the three rows highlighted in FIG. 7A as shown in FIG. 7B. First, referring to row 3, which pertains to the link from source host 140 to host 150$_3$, the deployment time is updated from 45 to 10. Further, the reduction in the deployment time results in the link from source host 140 to host 150$_3$ appearing on a preferred path, namely the new preferred path between source host 140 and host 150$_3$. Accordingly, a Yes entry is placed in the Preferred Path column of row 3.

Still referring to FIG. 7B, row 7 is updated to reflect that the link from host 150$_2$ to host 150$_3$ is no longer on any preferred path. Prior to the change 610, the link from host 150$_2$ to host 150$_3$ was a part of the preferred path from source host 140 to host 150$_3$, which proceeded from source host 140 to host 150$_1$ (having, as shown in FIGS. 6 and 7A, a deployment time of 10 minutes), then from host 150$_1$ to host 150$_2$ (10 minutes), and then from host 150$_2$ to host 150$_3$ (5 minutes). Therefore, prior to change 610, the preferred path from source host 140 to host 150$_3$ had a total deployment time of 10 minutes+10 minutes+5 minutes=25 minutes. However, after change 610, the new deployment time between source host 140 and host 150$_3$ is 10 minutes because the new preferred path from source host 140 to host 150$_3$ is the link between them. Therefore, the preferred path from source host 140 and to host 150$_3$ no longer involves the link from host 150$_2$ to host 150$_3$. Since the link from host 150$_2$ to host 150$_3$ is not on any other preferred path, the Preferred Path entry in row 7 is set to "No." Furthermore, since the link from host 150$_2$ to host 150$_3$ is not any preferred path, the entry in the Precondition column of row 7 is reset.

Finally, as shown in FIG. 7B, VMDME 130 updates row 9 of deployment time matrix 135 to reflect that, after change 610, the link from host 150$_3$ to host 150$_2$ is a part of a preferred path, namely the new preferred path from source host 140 to host 150$_2$. Prior to change 610, the preferred path from source host 140 to host 150$_2$ proceeded from source host 140 to host 150$_1$ (which, as shown in FIGS. 6 and 7A, had a deployment time of 10 minutes), and then, from host 150$_1$ to host 150$_2$ (10 minutes). Therefore, prior to change 610, the preferred path from source host 140 to host 150$_2$ had a total deployment time of 10 minutes+10 minutes=20 minutes. However, after the change 610, the new preferred path from source host 140 to host 150$_2$ proceeds from source host 140 to host 150$_3$ (which, as shown in FIG. 7B, has a deployment time of 10 minutes), and then, from host 150$_3$ to host 150$_2$ (5 minutes). Therefore, the new preferred path from source host 140 to host 150$_2$ has a total deployment time of 10 minutes+5 minutes=15 minutes and includes the link between host 150$_3$ and host 150$_2$. Accordingly, VMDME 130 sets the Preferred Path column in row 9 of deployment time matrix 135 to "Yes." Finally, FIG. 7B shows that the Precondition column entry for row 9 is updated by VMDME 130 to reflect that this link becomes deployable on a preferred path after a VM has been successfully deployed to host 150$_3$.

Figure 8A:
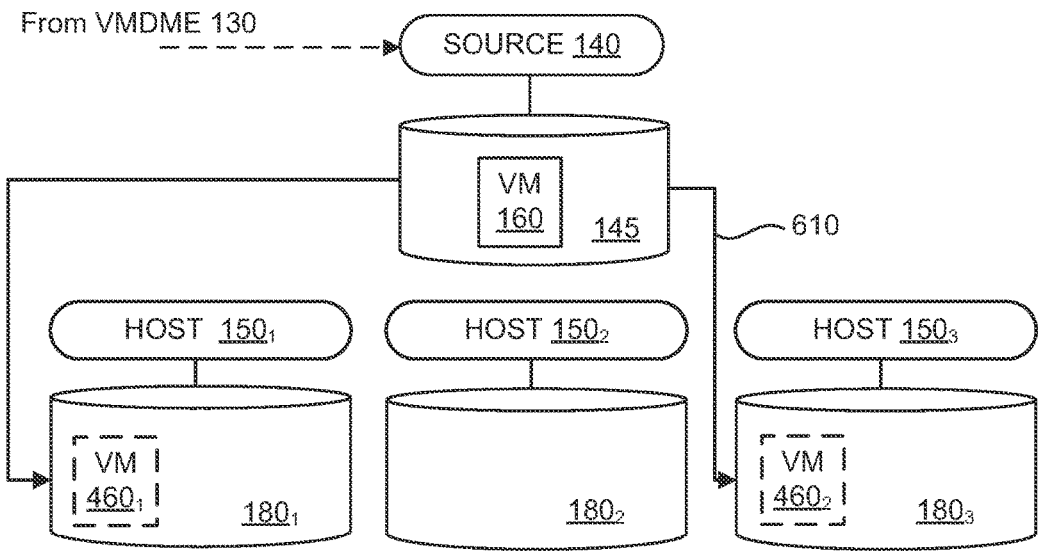
FIGS. 8A, 8B, and 8C are block diagrams that illustrate the steps carried out by a VMDME to deploy virtual machines to hosts connected to a computer network where, during the deployment, there occurs a change in the deployment time of one of the links in the computer network.
Figure 8B:
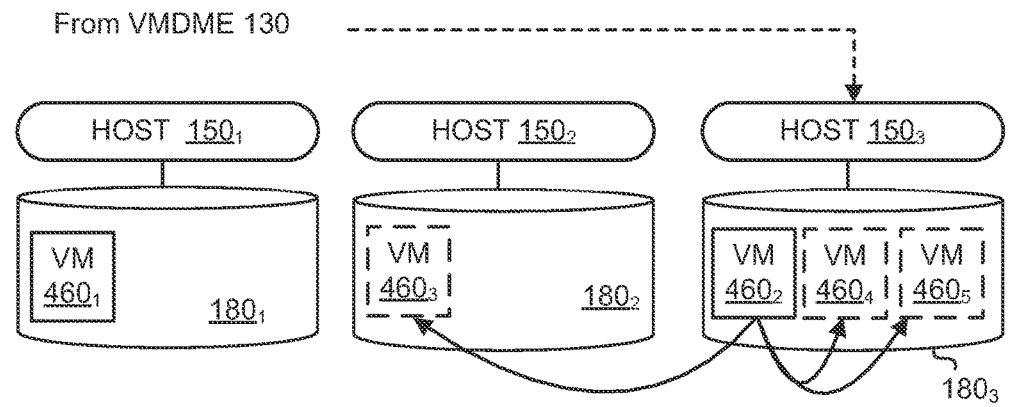
Figure 8C:
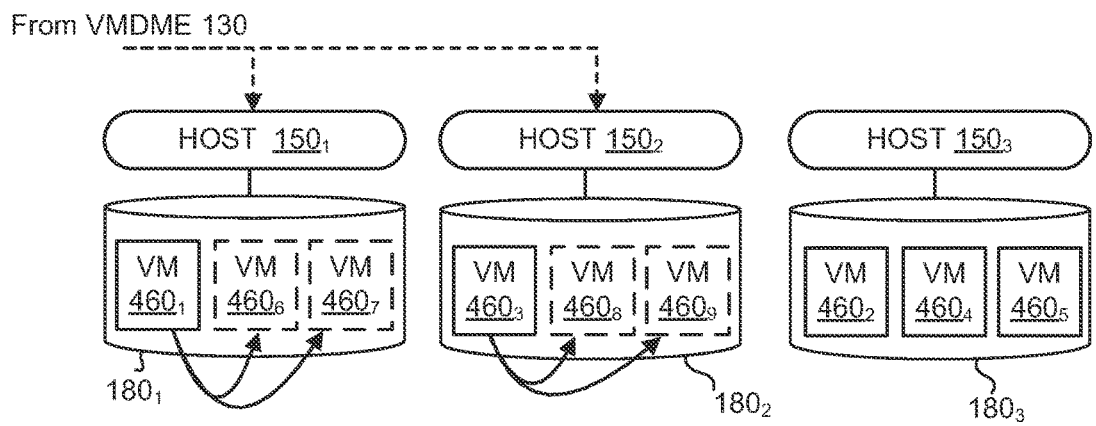

FIGS. 8A, 8B, and 8C are block diagrams that illustrate the steps carried out by embodiments of VMDME 130 to deploy copies of VM 160 in response to a change in the deployment time of a network link. Specifically, the embodiment depicted describes how VMDME 130 deploys from source host 140 to the target hosts 150$_1$, 150$_2$, and 150$_3$ in response to detecting the change 610 in deployment time between source host 140 and host 150$_3$, as described in FIGS. 6, 7A, and 7B.

In FIG. 8A, VMDME 130 initiates a deployment of VM 160 from source host 140 to host $150_1$. Subsequently, VMDME detects change 610. Prior to change 610 taking place, the preferred path from source host 140 to host $150_1$, as determined from the deployment time matrix 135 depicted in FIG. 7A, is the direct link from source host 140 to host $150_3$. Further, prior to change 610, the preferred paths from host 140 to each of hosts $150_2$ and $150_3$ pass through host $150_1$. Accordingly, VMDME 130 deploys a copy of VM 160 to VM $460_1$ on host $150_1$.

As is further depicted in FIG. 8A, VMDME 130 detects a change 610 in the deployment time from source host 140 to host $150_3$. In response to detecting change 610, VMDME 130 updates the deployment time matrix 135 to reflect the change, as was illustrated in FIG. 7B. As previously mentioned, the change in deployment time results in a change to the preferred paths to from source host 140 to hosts $150_2$ and $150_3$. Specifically, as was shown in FIGS. 6 and 7B, the new preferred paths from source host 140 to hosts $150_2$ and $150_3$ pass through host $150_3$. Accordingly, VMDME 130 deploys VM 160 from source host 140 to VM $460_2$ on host $150_3$. Note that the deployment from source host 140 to VM $460_1$ on host $150_1$ proceeds unchanged because the preferred path from source host 140 to host $150_1$ is unaffected by the change 610.

As shown in FIG. 8B, VM $460_1$ is fully deployed to host $150_1$ and VM $460_2$ is fully deployed to host $150_3$. According to the new preferred path from source host 140 to host $150_2$, as is depicted the FIG. 6 and the updated deployment time matrix 135 depicted in FIG. 7B, VMDME 130 deploys a copy of VM $460_2$ to VM $460_3$ on host $150_2$. Furthermore, VMDME 130 starts a local deployment of VM $460_2$ to VMs $460_4$ and $460_5$ on host $150_3$ because three copies of VM 160 are to be deployed to each target host. Finally, as shown in FIG. 8C, VM $460_3$ is fully deployed to host $150_2$. VMDME 130 then starts a local deployment of VMs $460_6$ and $460_7$ on host $150_1$ and VMs $460_8$ and $460_9$ on host $150_2$ because three copies of VM 160 are to be deployed to each target host.

Figure 9:
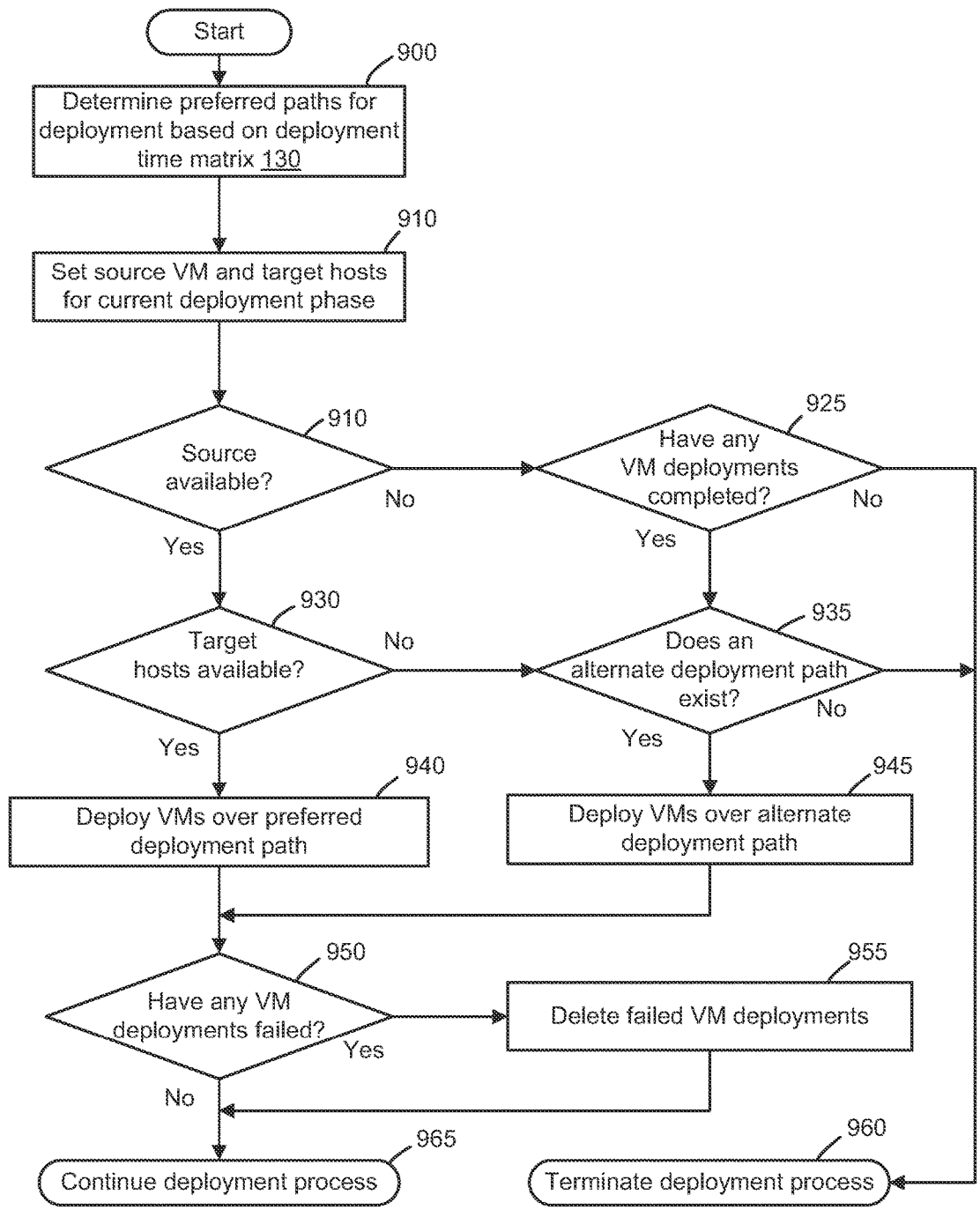
FIG. 9 is a flow diagram depicting the steps carried out by a VMDME in response to the unavailability of a source or host during a deployment of virtual machines.

During any phase of a deployment of a source VM, embodiments of VMDME 130 may detect the failure of one or more hosts or links in computer network 170. In response to detecting a failure, embodiments of VMDME 130 carries out steps to recover from the detected failure and continue deploying VMs. FIG. 9 is a flow diagram that illustrates the process followed by embodiments of VMDME 130 in response to determining that a source host 140 or hosts 150, as depicted in FIG. 1, have failed. At step 900, VMDME 130 determines the preferred path for each pair of hosts connected to computer network 170 in a current phase of the overall deployment of a source VM, as was previously described in FIG. 2. At step 910, the source hosts and target hosts for the current phase of the overall deployment are determined. VMDME 130 next determines, at step 920 whether a source host for the current deployment phase is available. If no sources are available, VMDME 130 determines, at step 925, whether any VM deployments to any hosts 150 have completed successfully. If VMDME 130 determines that no VMs have been deployed successfully, the overall deployment process terminates at step 960. For example, if, during the initial deployment phase, the source host 140 fails before any deployments have completed, the deployment process would terminate because there would exist no deployed VMs from which to deploy in place of the failed source host 140. However, if VMDME 130, at step 925, determines that VMs have been successfully deployed, then, at step 935, VMDME 130 determines whether or not an alternate deployment path exists from an already deployed host 150 to the target hosts that have yet to be deployed to. In embodiments, VMDME 130 makes this determination using the deployment time matrix 135. If VMDME 130 determines that an alternate path does exist, then, at step 945, VMDME 130 begins to deploy VMs over the determined alternate path.

Referring again to step 920, if VMDME 130 determines that the sources for the current deployment phase are available, then, at step 930, VMDME 130 determines whether all target hosts for the current deployment phase are available on a preferred path. If the target hosts are available, then, at step 940, VMDME 130 deploys VMs over the preferred path from the source to each target host in the current deployment phase, where the preferred paths have been determined from the deployment time matrix 135. However, if VMDME 130 determines that a target host 150 in the current deployment phase is not available on the preferred path, then, at step 935, VMDME 130 determines whether an alternate deployment path to the host 150 exists. Again, alternate deployment paths are determined, in embodiments, based on deployment time matrix 135. If VMDME 130 determines that there is an alternate path from the source to a target host 150, then, at step 945, VMDME 130 begins deploying over the determined alternate path. Otherwise, VMDME 130 terminates the current deployment at step 960.

At step 945, VMDME 130 determines whether any VM deployments have failed. In embodiments, a failed deployment is a partial deployment of a VM that terminated before completing. For example, a deployment to a host $150_a$ from another host $150_b$ may fail if, during the deployment, host $150_a$ fails. In such a case, VMDME 130 determines that host $150_b$ was partially deployed to (i.e., that it hosts a failed VM deployment). Upon making such a determination, VMDME 130, at step 955, deletes the determined failed deployments and continues the current deployment phase.

Figure 10A:
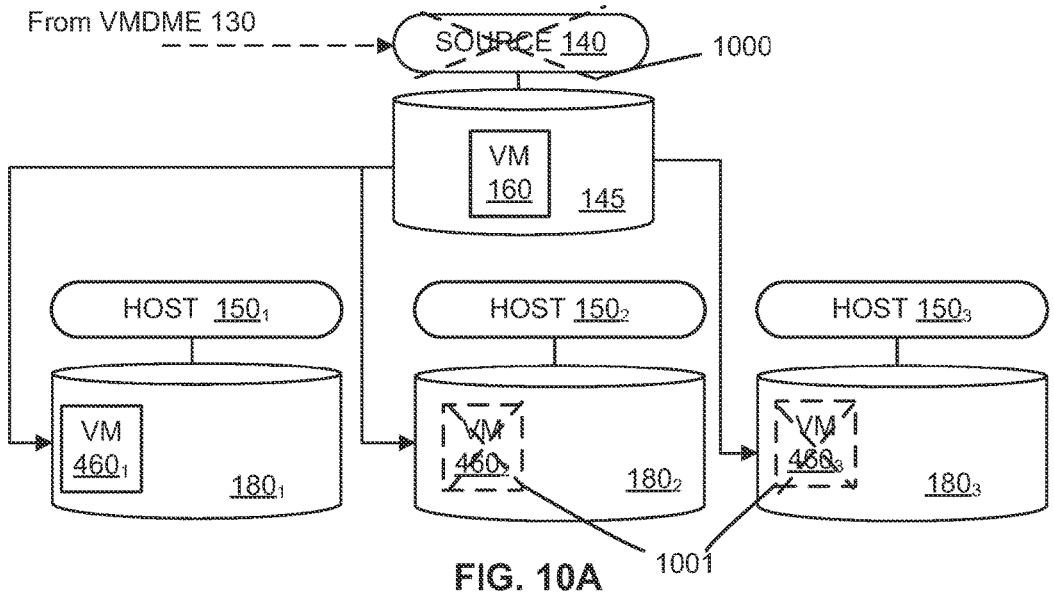
FIGS. 10A, 10B, and 10C are block diagrams that depict the steps carried out by a VMDME to deploy virtual machines connected to a computer network where, during the deployment, the source host fails.
Figure 10B:
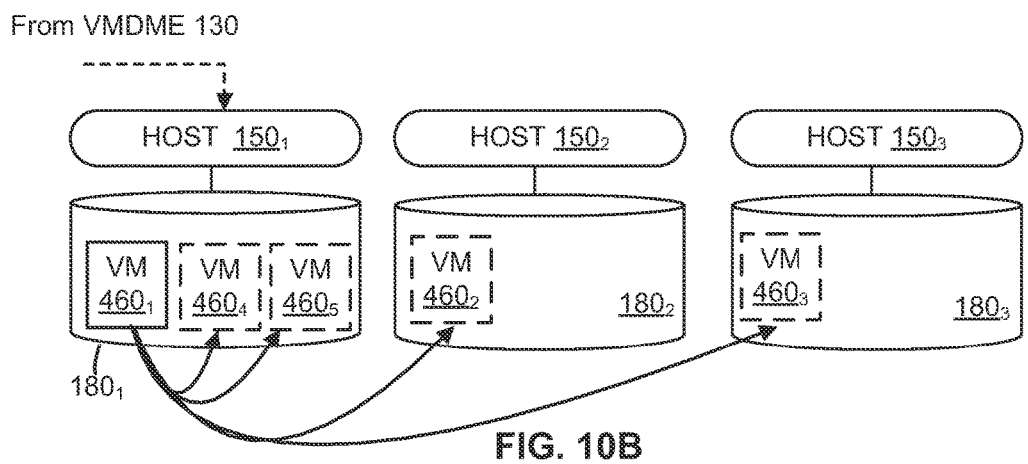
Figure 10C:
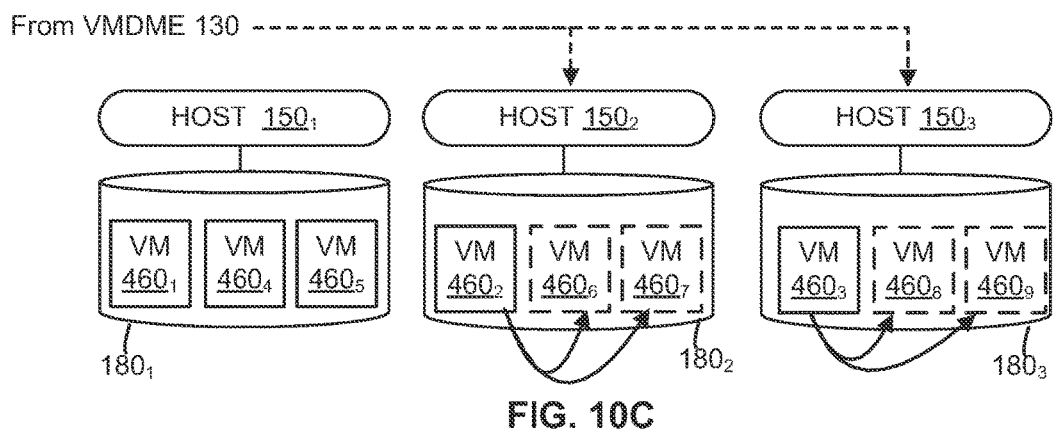

FIGS. 10A, 10B, and 10C are block diagrams that illustrate the steps carried out by an embodiment of VMDME 130 to recover from the failure of source host 140 during the deployment of three copies of VM 160 to each of hosts $150_1$, $150_2$, and $150_3$. Referring to FIG. 10A, VMDME 130, having determined from deployment time matrix 135 that the preferred path from source host 140 to each host 150 is the link between them, commences deploying a copy of VM 160 to each host. However, at 1000, source host 140 fails. As shown in FIG. 10A, prior to failure 1000, VM 160 had been successfully deployed to VM $460_1$ on host $150_1$. However, the deployments to VM $460_2$ on host $150_2$ and VM $460_3$ on host $150_3$ had not completed (i.e., these are failed deployments). Thus, as shown at 1001 in FIG. 10A, VMDME 130 deletes these failed deployments.

FIG. 10B shows that VMDME 130, having determined that source host 140 has failed, continues the deployment using the deployed VM $460_1$ as a source. Therefore, since a path from host $150_1$ to each of host $150_2$ and host $150_3$ is available, VMDME 130 proceeds to deploy VM $460_1$ to VM $460_2$ on host $150_2$ and to VM $460_3$ on host $150_3$. In addition, VMDME 130 launches a local deployment from VM $460_1$ to VMs $460_4$ and $460_5$ on host $150_1$ because three copies of VM 160 are to be deployed to each host.

In FIG. 10C, VM $460_2$ has been successfully deployed to host $150_2$ and VM $460_2$ has been successfully deployed to host $150_3$. Accordingly, VMDME 130 launches a local deployment from VM$460_2$ to VMs $460_6$ and $460_7$ on host $150_2$, and from VM $460_3$ to VMs $460_8$ and $460_9$ on host $150_3$ because three copies of VM 160 are to be deployed to each host.

Figure 11:
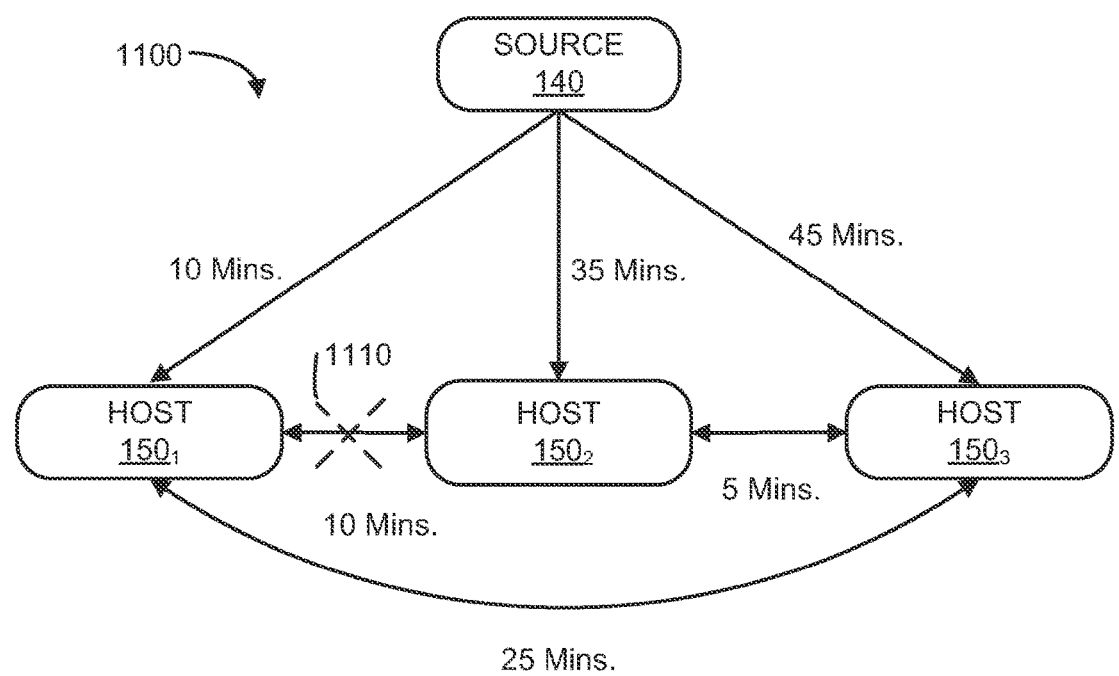
FIG. 11 is a block diagram illustrating a computer network that connects a source with target hosts over which virtual machine deployments take place, where a link in the network fails.

In addition, embodiments of VMDME 130 carry out steps to recover from the failure of one or more links in a computer network. FIG. 11 illustrates a computer network 1100, wherein a source host 140 and three target hosts, $150_1$, $150_2$, and $150_3$, are linked. As was previously illustrated, a deployment time is associated with each link from the source host 140 and each host. Further, as illustrated by the dashed cross at 1110, the link between hosts $150_1$ and $150_2$ fails.

Figures 12A, 12B:
FIGS. 12A and 12B are tables that depict deployment time matrices before and after the failure of a link in a computer network.

In response to the failure 1110, VMDME 130 updates deployment time matrix 135 to reflect any changes to preferred paths that result from the failure. FIG. 12A depicts the deployment time matrix 135 before the failure 1110. FIG. 12B depicts deployment time matrix 135 after failure 1110. As highlighted in deployment time matrix 135 depicted in FIG. 12B, the link from host $150_1$ to host $150_2$ in row 4, as well as the reverse link in row 6, is removed. This is illustrated by the strikethroughs depicted in FIG. 12B.

Further, row 7, which refers to the link from host $150_2$ to $150_3$, is highlighted. Referring to FIG. 12A, this link is identified as appearing on a preferred path, as shown by the "Yes" entry in the Preferred Path column for row 7. Prior to failure 1110, the link from host $150_2$ to host $150_3$ is a part of the preferred path from source host 140 to $150_3$, which includes: (1) the link from source host 140 to host $150_1$ (having a deployment time of 10 minutes); (2) the link from host $150_1$ to host $150_2$ (10 minutes); and (3) the link from host $150_2$ to host $150_3$ (5 minutes). Thus prior to failure 1110, the preferred path from source host 140 to host $150_3$ has a total deployment time of 10 minutes+10 minutes+5 minutes=25 minutes.

However, after failure 1110, the preferred path from source host 140 to host $150_3$ includes: (1) the link from source host 140 to host $150_1$ (having a deployment time of 10 minutes); and (2) the link from host $150_1$ to host $150_3$ (25 minutes). Therefore, after failure 1110, the preferred path from source host 140 to host $150_3$ has a total deployment time of 10 minutes+25 minutes=35 minutes. Note the preferred path from source host 140 to host $150_3$ no longer includes the link from host $150_2$ to host $150_3$. Because the link from host $150_2$ to host $150_3$ is no longer on any preferred path, deployment time matrix 135 is updated by VMDME 130 changing the Preferred Path entry in row 7 from Yes to No. Also, as shown in row 5, the Preferred Path entry is changed from No to Yes because the link from host $150_1$ to host $150_2$ is on preferred path. In addition, as shown in row 9 of deployment time matrix 135 of FIG. 12B, the link from host $150_3$ to host $150_2$ is deployable on the preferred path from host $150_3$ to host $150_2$, subject to the precondition that a VM must first be deployed to host $150_3$.

Figure 13A:
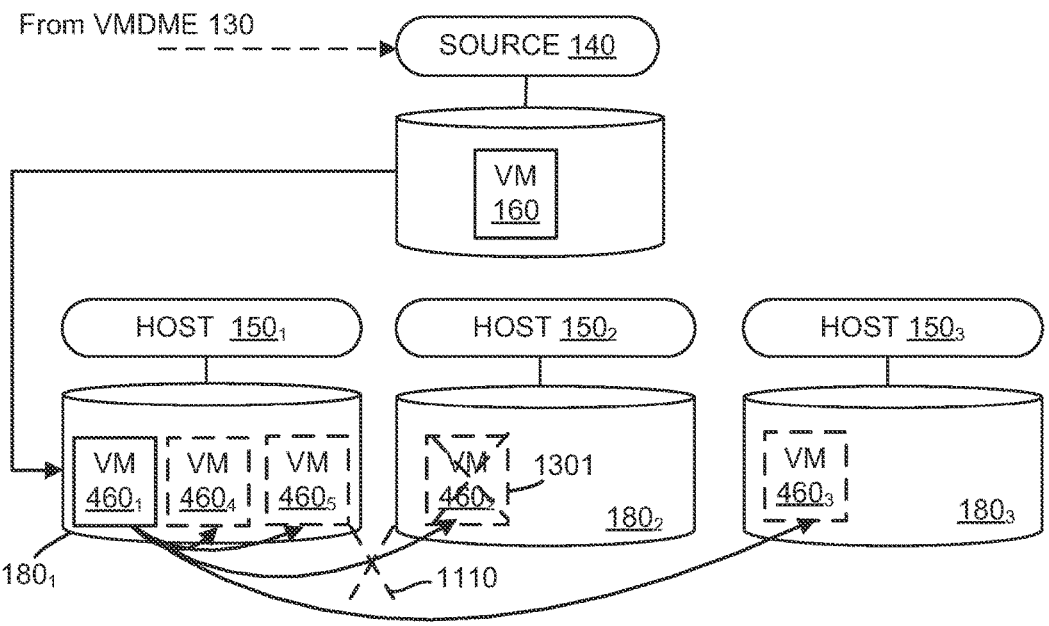
FIGS. 13A, 13B, and 13C are block diagrams depicting the steps carried out by a VMDME to deploy virtual machines connected to a computer network where, during the deployment, a link in the computer network fails.
Figure 13B:
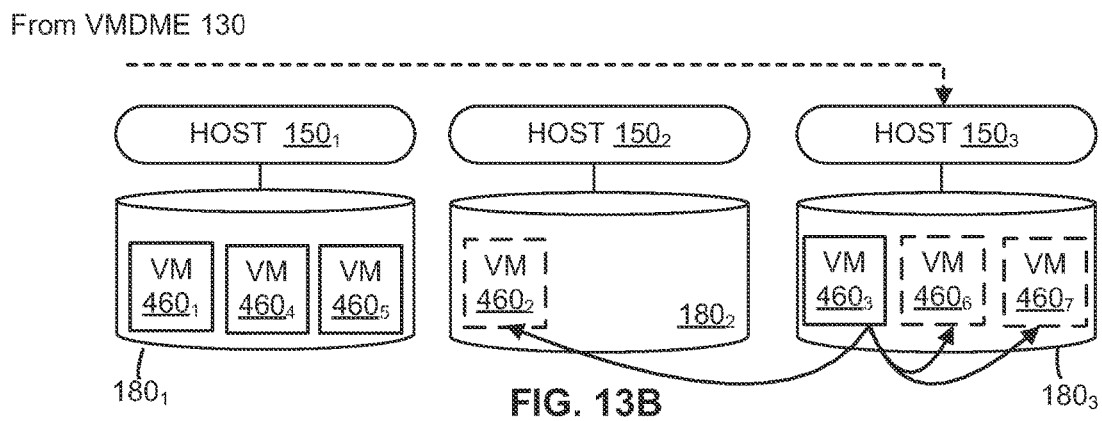
Figure 13C:
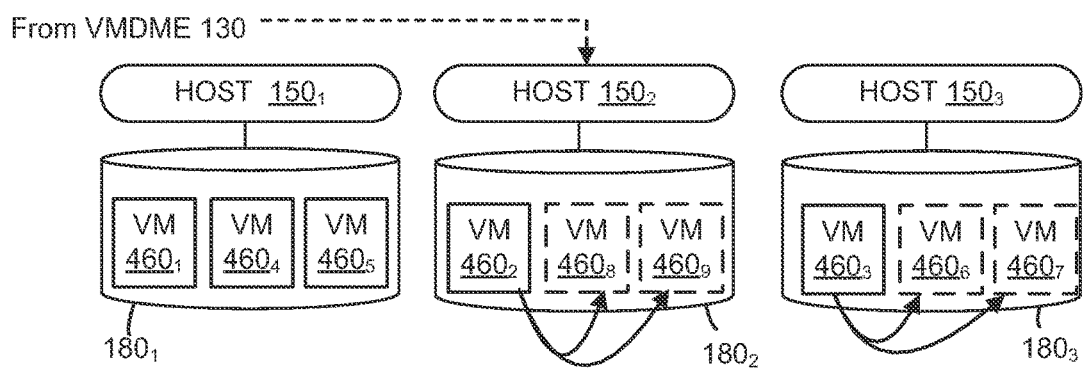

FIGS. 13A, 13B, and 13C illustrate the steps carried out by an embodiment of VMDME 130 to deploy three copies of VM 160 on source host 140 to each of the three hosts $150_1$, $150_2$, and $150_3$ in response to failure 1110 depicted in FIG. 11. In FIG. 13A, VMDME 130 commences the deployment of VMs according to the preferred paths determined from the deployment time matrix 135 depicted in FIG. 12A. Accordingly, VM 160 is deployed first to VM $460_1$ on host $150_1$. After VM $460_1$ is successfully deployed, VMDME 130 initiates deployments from VM $460_1$ to VM $460_2$ on host $150_2$. As shown in FIG. 13A, failure 1110 occurs after deployment to host $150_2$ has begun. Therefore, a partial (or failed) deployment exists on host $150_2$ after failure 1110 occurs. Accordingly, VMDME 130 deletes the failed deployment at 1301. As shown in FIG. 13A, in response to failure 1110, VMDME updates the deployment time matrix and, based on the new preferred path, VM $460_3$ is deployed to host $150_3$ from VM $460_1$ on host $150_1$. VMDME 130 also initiates a local deployment from VM $460_1$ to VMs $460_4$ and $460_5$ on host $150_1$ because three copies of VM 160 are to be deployed to each host.

In FIG. 13B, VM $460_3$ has been fully deployed on host $150_3$. VMDME 130 then makes the determination, using deployment time matrix 135, that VM $460_2$ on host $150_2$ is to be deployed from VM $460_3$. Further, VMDME 130 initiates a local deployment from VM $460_3$ to VMs $460_6$ and $460_7$ on host $150_3$ in order to complete deploying VMs to host $150_3$. Referring to FIG. 13C, VMs $460_1$, $460_4$, and $460_5$ have been deployed successfully to host $150_1$ and VMs $460_3$, $460_6$, and $460_7$ have been deployed successfully to host $150_3$. Further, VM $460_2$ is fully deployed to host $150_2$. Accordingly, VMDME 130 starts deploying VM $460_2$ to VMs $460_8$ and $460_9$ on host $150_2$ in order to complete deployments to host $150_2$.

Accordingly, embodiments of the present disclosure provide a system and method for deploying and cloning VMs on a group of host computers using a deployment time matrix. Known approaches for cloning or deploying VMs take a single source virtual machine or template as a reference, and all clone or deploy operations are invoked from the single source virtual machine. Using previous approaches, to create multiple instances of the same source VM on the same destination, data and content from the source host would have to be copied to the destination host for each and every clone or deployment operation. Further, if the source and destination hosts were separate entities, every clone or deploy operation would cause VM data to travel through the network to reach the destination, thereby consuming a large amount of network bandwidth. Using a single source VM as the reference for deploy or clone operations also introduces a single point of failure: if the source host fails or source VM becomes corrupted, all clone or deploy operations would be affected. In contrast, embodiments of the present disclosure provide improved techniques which address the above-discussed issues by distributively deploying and cloning VMs on a group host computers using a deployment time matrix.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer-implemented method of cloning virtual machines in a plurality of host computers connected via a computer network, the host computers comprising a source host computer and a set of target host computers having at least a first target host computer and a second target host computer, the method comprising:

receiving a request to clone multiple copies of a source virtual machine residing on the source host computer to the set of target host computers, the request designating one of the target host computers for each of the multiple copies to be cloned; and in response to the request:

determining a deployment time between each pair of the plurality of host computers, the deployment time for a particular pair indicating time needed to clone the source virtual machine from one host computer to the other host computer in the pair, via a network link between the pair of host computers without any other intervening host computers:

for each copy of the source virtual machine to be cloned, determining a path from the source host computer to a target host computer associated with the copy of the source virtual machine to be cloned, the path being selected based on the determined deployment times to minimize the time taken to clone the copy of the source virtual machine from the source host computer to the target host computer associated with the copy of the source virtual machine to be cloned;

cloning a first copy of the source virtual machine from the source host computer to the first target host computer, wherein a first path determined for the first copy of the source virtual machine is a first network link between the source host computer and a first target host computer without any other intervening host computers; and cloning a second copy of the source virtual machine by copying from the first copy of the source virtual machine on the first target host computer, wherein a second path determined for the second copy of the source virtual machine includes the first network link and a second network link between the first target host computer and the second target host computer without any other intervening host computers, and wherein the second copy of the source virtual machine is cloned on the second target host computer by copying from the first copy of the source virtual machine using the second network link, after the first copy of the source virtual machine is cloned from the source host computer to the first target host computer using the first network link.

2. The method of claim 1, wherein cloning a second copy of the source virtual machine comprises:

once the first copy of the source virtual machine is cloned, locally cloning a second copy of the source virtual machine on the first target host computer by copying from the first copy of the source virtual machine.

3. The method of claim 2, wherein the first copy of the source virtual machine is cloned to a first data store of the first target host computer, and the second copy of the source virtual machine is cloned to a second data store of the first target host computer using the first copy of the source virtual machine.

4. The method of claim 1, wherein the second copy of the source virtual machine is cloned on the second target host computer by copying from the first copy of the source virtual machine, after the first copy of the source virtual machine is cloned from the source host computer to the first target host computer.

5. The method of claim 1 further comprising:

responsive to detecting a change event in the plurality of host computers or the computer network, updating the deployment times between the plurality of host computers;

determining an updated path for each copy of the source virtual machine to be cloned based on the updated deployment times; and cloning each copy of the source virtual machine to be cloned based on the updated path.

6. The method of claim 5, wherein the change event comprises a failure of at least one of the plurality of host computers.

7. The method of claim 5, wherein the change event comprises a failure of a link between two of the host computers without any intervening host computers.

8. The method of claim 1, wherein the determined deployment times are stored in a deployment time matrix.

9. A virtualized computing system comprising:
a plurality of host computers connected via a computer network; the host computers comprising a source host computer and a set of target host computers having at least a first target host computer and a second target host computer; and
a management module configured to:
receive a request to clone multiple copies of a source virtual machine residing on the source host computer to the set of target host computers, the request designating one of the target host computers for each of the multiple copies to be cloned; and
in response to the request,
determine a deployment time between each pair of the plurality of host computers, the deployment time for a particular pair indicating time needed to clone the source virtual machine from one host computer to the other host computer in the pair; via a network link between the pair of host computers without any other intervening host computers;
for each copy of the source virtual machine to be cloned, determine a path from the source host computer to a target host computer associated with the copy of the source virtual machine to be cloned, the path being selected based on the determined deployment times to minimize the time taken to clone the copy of the source virtual machine from the source host computer to the target host computer associated with the copy of the source virtual machine to be cloned;
clone a first copy of the source virtual machine from the source host computer to the first target host computer, wherein a first path determined for the first copy of the source virtual machine is a first network link between the source host computer and a first target host computer without any other intervening host computers; and
clone a second copy of the source virtual machine by copying from the first copy of the source virtual machine on the first target host computer, wherein a second path determined for the second copy of the source virtual machine includes the first network link and a second network link between the first target host computer and the second target host computer without any other intervening host computers, and wherein the second copy of the source virtual machine is cloned on the second target host computer by copying from the first copy of the source virtual machine using the second network link, after the first copy of the source virtual machine is cloned from the source host computer to the first target host computer using the first network link.

10. The system of claim 9, wherein cloning a second copy of the source virtual machine comprises:
once the first copy of the source virtual machine is cloned, locally cloning a second copy of the source virtual machine on the first target host computer by copying from the first copy of the source virtual machine.

11. The system of claim 9, wherein the second copy of the source virtual machine is cloned on the second target host computer by copying from the first copy of the source virtual machine, after the first copy of the source virtual machine is cloned from the source host computer to the first target host computer.

12. The virtualized computing system of claim 9, wherein the management module is further configured to:
responsive to detecting a change event in the plurality of host computers or the computer network, update the deployment times between the plurality of host computers;
determine an updated path for each copy of the source virtual machine to be cloned based on the updated deployment times; and
clone each copy of the source virtual machine to be cloned based on the updated path.

13. The virtualized computing system of claim 12, wherein the change event comprises a failure of at least one of the plurality of host computers.

14. The virtualized computing system of claim 12, wherein the change event comprises a failure of a link between two of the host computers without any intervening host computers.

15. A non-transitory computer readable medium having stored thereon instructions which, when executed, causes a processor to perform a method of cloning virtual machines in a plurality of host computers connected via a computer network, the host computers comprising a source host computer and a set of target host computers having at least a first target host computer and a second target host computer, the method comprising:
receiving a request to clone multiple copies of a source virtual machine residing on the source host computer to the set of target host computers, the request designating one of the target host computers for each of the multiple copies to be cloned; and
in response to the request:
determining a deployment time between each pair of the plurality of host computers, the deployment time for a particular pair indicating time needed to clone the source virtual machine from one host computer to the other host computer in the pair, via a network link between the pair of host computers without any other intervening host computers;
for each copy of the source virtual machine to be cloned, determining a path from the source host computer to a target host computer associated with the copy of the source virtual machine to be cloned, the path being selected based on the determined deployment times to minimize the time taken to clone the copy of the source virtual machine from the source host computer to the target host computer associated with the copy of the source virtual machine to be cloned;
cloning a first copy of the source virtual machine from the source host computer to the first target host computer, wherein a first path determined for the first copy of the source virtual machine is a first network link between the source host computer and a first target host computer without any other intervening host computers; and
cloning a second copy of the source virtual machine by copying from the first copy of the source virtual machine on the first target host computer, wherein a second path determined for the second copy of the source virtual machine includes the first network link and a second network link between the first target host computer and the second target host computer without any other intervening host computers, and wherein the second copy of the source virtual machine is cloned on the second target host computer by copying from the first copy of the source virtual machine using the second network link, after the first copy of the source virtual machine is cloned from the source host computer to the first target host computer using the first network link.

16. The non-transitory computer readable medium of claim 15, wherein cloning a second copy of the source virtual machine comprises:
   once the first copy of the source virtual machine is cloned, locally cloning a second copy of the source virtual machine on the first target host computer by copying from the first copy of the source virtual machine.

17. The non-transitory computer readable medium of claim 15, wherein the second copy of the source virtual machine is cloned on the second target host computer by copying from the first copy of the source virtual machine, after the first copy of the source virtual machine is cloned from the source host computer to the first target host computer.

18. The non-transitory computer readable medium of claim 15, wherein the method further comprises:
   responsive to detecting a change event in the plurality of host computers or the computer network, updating the deployment times between the plurality of host computers;
   determining an updated path for each copy of the source virtual machine to be cloned based on the updated deployment times; and
   cloning each copy of the source virtual machine to be cloned based on the updated path.

19. The non-transitory computer readable medium of claim 18, wherein the change event comprises a failure of at least one of the plurality of host computers.

20. The non-transitory computer readable medium of claim 18, wherein the change event comprises a failure of a link between two of the host computers without any intervening host computers.

* * * * *